US009140557B2

(12) United States Patent
Taylor, Jr. et al.

(10) Patent No.: US 9,140,557 B2
(45) Date of Patent: Sep. 22, 2015

(54) SYSTEM AND METHOD FOR TRACKING AND LOCATING A PERSON, ANIMAL, OR MACHINE

(71) Applicants: David W. A. Taylor, Jr., Greensboro, NC (US); Bradley David Farnsworth, Alexandria, VA (US); William Todd Faulkner, Sylva, NC (US); Christopher Matthew Foster, Fairfax, VA (US); Robert Barlow Alwood, Springfield, VA (US)

(72) Inventors: David W. A. Taylor, Jr., Greensboro, NC (US); Bradley David Farnsworth, Alexandria, VA (US); William Todd Faulkner, Sylva, NC (US); Christopher Matthew Foster, Fairfax, VA (US); Robert Barlow Alwood, Springfield, VA (US)

(73) Assignee: ENSCO, INC., Falls Church, VA (US)

( * ) Notice: Subject to any disclaimer, the term of this patent is extended or adjusted under 35 U.S.C. 154(b) by 0 days.

(21) Appl. No.: 14/107,156

(22) Filed: Dec. 16, 2013

(65) Prior Publication Data

US 2014/0203970 A1   Jul. 24, 2014

Related U.S. Application Data

(63) Continuation of application No. 13/746,833, filed on Jan. 22, 2013, now Pat. No. 8,862,394.

(51) Int. Cl.
*G01C 21/12* (2006.01)
*G01R 31/08* (2006.01)
(Continued)

(52) U.S. Cl.
CPC ............... *G01C 21/16* (2013.01); *G01C 21/165* (2013.01); *G01C 21/20* (2013.01); *G01C 21/206* (2013.01); *G01S 13/84* (2013.01); *G01S 19/14* (2013.01)

(58) Field of Classification Search
USPC .................. 701/470; 370/252; 342/357.57
See application file for complete search history.

(56) References Cited

U.S. PATENT DOCUMENTS 6,122,329 A   9/2000   Zai et al.
6,594,617 B2  7/2003   Scherzinger
(Continued)

FOREIGN PATENT DOCUMENTS

CA   2766700   12/2010

OTHER PUBLICATIONS

Kelly, Alonzo, "Personal Navigation System Based on Dual Shoe-Mounted IMUs and Intershoe Ranging", Personal Precision Locator Workshop, Aug. 1, 2011, pp. 1-28.
(Continued)

*Primary Examiner* — Thomas G Black
*Assistant Examiner* — Tyler Paige
(74) *Attorney, Agent, or Firm* — Finnegan, Henderson, Farabow, Garrett & Dunner, L.L.P.

(57) ABSTRACT

A system and method for estimating the position of an object, such as a person, animal, or machine. The system includes first and second inertial measurement units, a first and second originator antennas, and a first and second transponder antennas. The system uses data from the inertial measurement units to estimate a position of the object. The system also calculates a range measurement between the first originator antenna and first transponder antenna. The system calculates a first CPD measurement between the second transponder antenna and the first originator antenna, and a second CPD measurement between the second originator antenna and the first transponder antenna. The range measurement and at least one CPD measurement are used to update a Kalman filter for estimating the position of the object. The system determines also updates the Kalman filter when one of the inertial measurement units is in a zero-velocity condition.

14 Claims, 15 Drawing Sheets

(51) Int. Cl.
G01S 19/19 (2010.01)
G01C 21/16 (2006.01)
G01C 21/20 (2006.01)
G01S 19/14 (2010.01)
G01S 13/84 (2006.01)

(56) References Cited

U.S. PATENT DOCUMENTS

| | | | |
|---|---|---|---|
| 7,812,762 B2 * | 10/2010 | Shamoto | 342/357.26 |
| 8,164,514 B1 * | 4/2012 | Yang et al. | 342/357.28 |
| 8,199,047 B2 | 6/2012 | Fretenburg et al. | |
| 8,224,575 B2 | 7/2012 | Faulkner et al. | |
| 8,271,309 B2 | 9/2012 | Stephens et al. | |
| 8,452,624 B2 | 5/2013 | Dufresne et al. | |
| 8,473,241 B2 | 6/2013 | Foxlin | |
| 2002/0143491 A1 | 10/2002 | Scherzinger | |
| 2003/0097284 A1 | 5/2003 | Shinozaki | |
| 2005/0007946 A1 * | 1/2005 | Barreto | 370/203 |
| 2007/0257836 A1 | 11/2007 | Chaplin | |
| 2008/0018532 A1 * | 1/2008 | Mackintosh et al. | 342/357.12 |
| 2008/0046179 A1 * | 2/2008 | Mackintosh et al. | 701/213 |
| 2008/0077326 A1 | 3/2008 | Funk et al. | |
| 2008/0174482 A1 * | 7/2008 | Watson et al. | 342/357.04 |
| 2009/0071805 A1 | 3/2009 | Horning et al. | |
| 2009/0073045 A1 | 3/2009 | Supino et al. | |
| 2009/0111616 A1 | 4/2009 | Creelman | |
| 2009/0274079 A1 * | 11/2009 | Bhatia et al. | 370/310 |
| 2009/0326795 A1 | 12/2009 | Supino et al. | |
| 2010/0004860 A1 | 1/2010 | Chernoguz et al. | |
| 2010/0123625 A1 | 5/2010 | Martin et al. | |
| 2010/0305779 A1 | 12/2010 | Hassan et al. | |
| 2010/0331145 A1 | 12/2010 | Lakovic et al. | |
| 2011/0075581 A1 * | 3/2011 | Mihota | 370/252 |
| 2011/0125063 A1 | 5/2011 | Shalon et al. | |
| 2011/0238308 A1 | 9/2011 | Miller et al. | |
| 2012/0274508 A1 | 11/2012 | Brown et al. | |
| 2013/0130843 A1 | 5/2013 | Burroughs et al. | |
| 2014/0203971 A1 | 7/2014 | Taylor, Jr. | |
| 2014/0207374 A1 * | 7/2014 | Taylor et al. | 701/470 |

OTHER PUBLICATIONS

Timothy J. Brand and Richard E. Phillips, "Foot-to-Foot Range Measurement as an Aid to Personal Navigation," ION 59$^{th}$ Annual Meeting/CIGTF 22$^{nd}$ Guidance Test Symposium, Jun. 2003.

Michel Laverne et al., "Experimental Validation of Foot to Foot Range Measurements in Pedestrian Tracking," Proceedings of the 24th International Technical Meeting of The Satellite Division of the Institute of Navigation (ION GNSS 2011), Sep. 2011.

Foxlin, Eric, Pedestrian Tracking with Shoe Mounted Inertial Sensors, IEEE Computer Graphics and Applications, Nov./Dec. 2005, pp. 38-46.

Keller, Michael, GPS-Free Tech Can Track Miners' and Soldiers' Boots Underground, Scientific American.

* cited by examiner

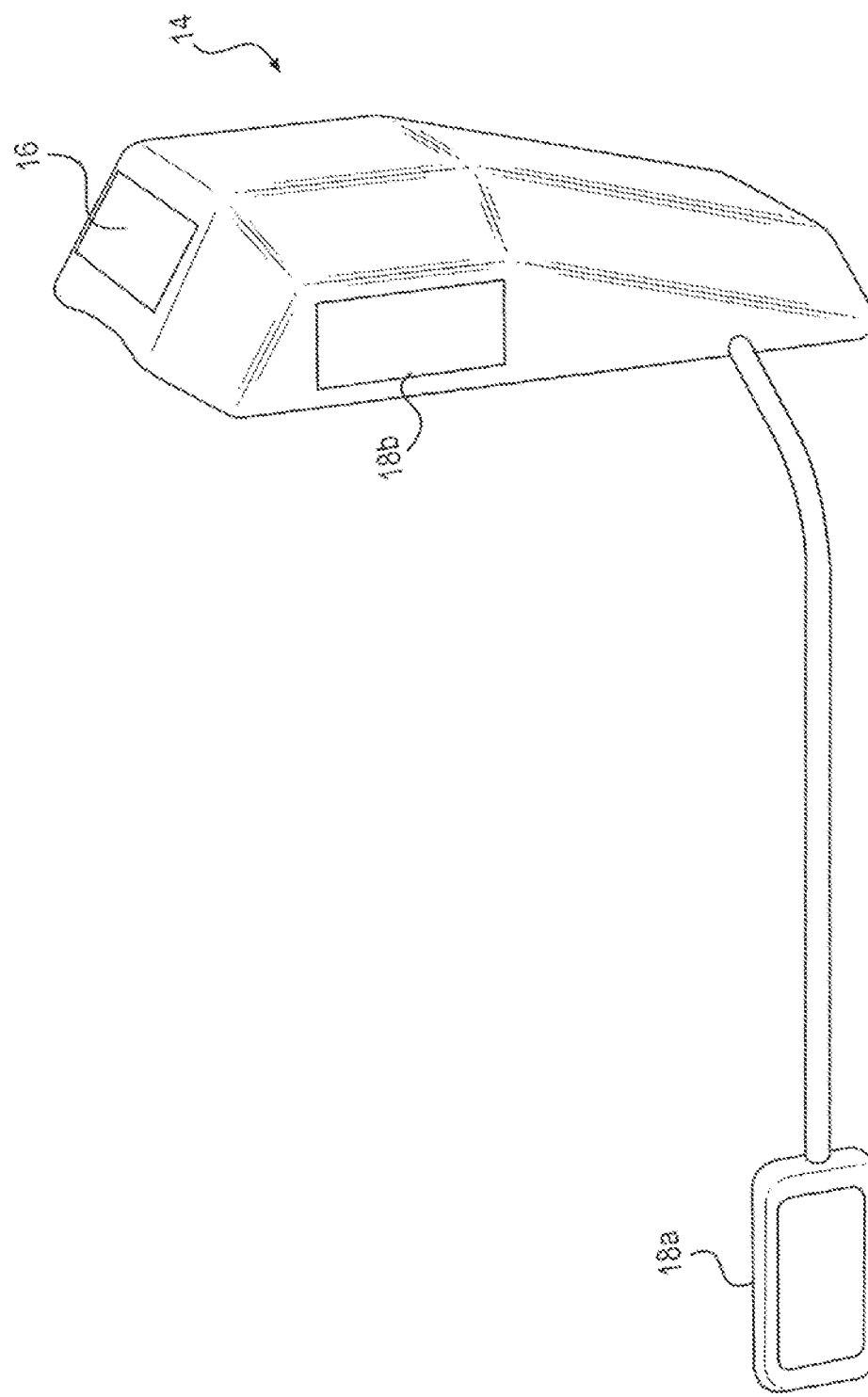

SYSTEM AND METHOD FOR TRACKING AND LOCATING A PERSON, ANIMAL, OR MACHINE

CROSS REFERENCE TO RELATED APPLICATION

This application is a continuation of U.S. application Ser. No. 13/746,833, filed Jan. 22, 2013, the subject matter of each of which is incorporated herein by reference in its entirety.

GOVERNMENT RIGHTS

This invention was made with Government support under Contract No. W900KK-11-C-0024 awarded by the Department of Defense. The government may have certain rights in this invention.

BACKGROUND

1. Technical Field

This disclosure relates to a system and method for tracking and locating a person, animal, or machine.

2. Description of Related Art

A basic principle in navigation processes is known as "dead reckoning." In dead reckoning, the current position of an object is estimated by measuring the course, speed, and time elapsed since the object was in a known starting position. For example, a person who is orienteering may utilize dead reckoning. By multiplying their average walking speed by the elapsed time, the person can estimate a total distance traveled. Using a map, the person can thus plot their path from a known starting position along a measured compass course. Dead reckoning, however, is only as reliable as the data that is used. In the orienteering example, error may be introduced in the estimates of the course traveled, the average speed, and the elapsed time. As technology developed, inertial navigation systems were developed to address these sources of error to enable more accurate navigation.

Dead reckoning devices may be used by first responders and warfighters to track the location of the first responder or warfighter when tracking systems, such as Global Positions Systems (GPS), are unavailable. Instances where GPS is unavailable may include underground or deep natural locations, such as mines, canyons, caves, tunnels, bunkers, and basements; urban locations, such as skyscrapers and other large buildings; or locations with active interference of GPS signals or high levels of electromagnetic interference.

Inertial navigation systems perform a sensor-based dead reckoning by using data from an inertial measurement unit (IMU) separately or in combination with a digital magnetic compass (DMC). IMUs typically include three mutually orthogonal linear accelerometers and three mutually orthogonal rate gyroscopes to collect time-series data of linear accelerations and angular rates in the reference frame of the IMU. Generally the three accelerations are measured by accelerometers and the angular rates are measured by gyroscopes. These six values fully characterize the dynamics of the IMU. DMCs provide three measurements of the strength of the measured magnetic field relative to the same fixed orthogonal axes used to calculate linear acceleration. In the absence of magnetic disturbances, the direction of the measured magnetic field vector gives an estimate of the "magnetic heading."

There are various grades of IMU, which vary by cost, accuracy, size, and weight. The heaviest, most expensive, and most accurate are "navigation-grade" IMUs, which often weigh between five and one hundred pounds. The weight and cost of such IMUs make them impractical for most human-portable applications. At the other end of the spectrum are "industrial-grade" IMUs, which are considerably lighter and less expensive, making them more practical for human-portable applications despite the decreased accuracy. In the middle of the spectrum are "tactical-grade" IMUs.

Typical IMUs and DMCs provide data at roughly 50 to 1000 samples per second. The "operating frequency" of, for example, an IMU is defined as the number of times per second that the six measurements (three linear accelerations and three angular rates) are taken. Each of these time steps is known as "data cycles." During each data cycle, the six measurements, collectively known as an "IMU data packet," are sent to a data processor in the inertial navigation system to integrate navigation equations known in the art to produce a current estimate of the velocity. The data processor then integrates again to produce current estimates of the position and the attitude (i.e. pitch, roll and navigation heading) of the IMU.

In a similar manner, the three measurements of magnetic field strength, collectively known as a "DMC data packet" are also taken and sent to the data processor in the inertial navigation system to produce a current estimate of the magnetic heading. The operating frequency of the IMU and the DMC may be the same or different.

The integrations performed by the data processor inherently produce finite errors in the real-time estimates of the position, velocity, and attitude, collectively known as "navigation errors." If uncorrected, these errors grow unbounded with time. To help bound the navigation errors, it is common in the art to employ various filtering techniques. One class of filters often used in inertial navigation systems is known as Kalman filters. The term "Kalman filter" will be used to collectively refer to members and variants in this class of filters, including but not limited to extended Kalman filters (EKF) and unscented Kalman filters (UKF). Kalman filters are further described in U.S. Pat. No. 8,224,575 (which is assigned to the same assignee as the present patent application), the disclosure of which is hereby incorporated by reference in its entirety.

Although navigation errors are significantly decreased using Kalman filters, other sources of error, such as inaccuracies inherent to an IMU, persist. Because the position estimate is often the most important output of an inertial navigation system, one goal of such a system is to limit the time-induced increase of errors in the position estimate. For simplification, this specification will subdivide position errors into two components, "along-track" and "cross-track" errors. "Along-track" errors refer to errors in the total distance traveled while "cross-track" errors refer to errors in the direction perpendicular to the direction of travel. Cross-track and along-track errors may also be referred to collectively as "heading errors" or "navigation errors."

Several techniques have been utilized to help reduce navigation errors in a human-portable inertial navigation system in order to make such systems more accurate for a longer period of use. One such technique for constraining both along-track and cross-track errors is to implement a zero-velocity update (ZUPT) when the IMU is at rest. During a ZUPT, the IMU updates the Kalman fitter with a velocity vector showing that the IMU is at zero velocity. Based on a ZUPT, the system may correct errors in the attitude by using the vertical gravity vector, correct position errors, and estimate correlated IMU errors. Generally, the accuracy of the real-time position estimate from the Kalman filter is directly related to the frequency of the ZUPTs.

ZUPTs are often implemented by placing an IMU on the shoe or boot of a user to utilize the fact that a shoe is normally at zero velocity for a period of time, however brief, during part of a movement, regardless of whether the user is running, walking, or even crawling. This stationary period is exploited to constrain navigation and position errors.

Current ZUPT methods may detect zero-velocity conditions for users who are walking or moving at relatively slow velocities. However, during fast movements, such as jogging, running, or sprinting, current ZUPT methods are inadequate for recognizing zero-velocity conditions. For example, during fast movements, the rotation of IMU may continue through the movement, although the overall velocity of the IMU is close to zero. Similarly, during fast movements, the IMU may be rotated such that gravity adds an additional component to each IMU axis, masking the actual acceleration components of IMU.

In addition to implementing ZUPTs, some systems use global positioning system (GPS) satellites to update the Kalman filter with a known position, thereby constraining position errors. These systems utilize a single GPS receiver, often mounted on the shoulder or torso of the user. One limitation with the use of GPS, however, is that in many locations, such as underground or in a building away from windows, a user may not be able to receive data from GPS satellites.

In the absence of a GPS signal, pedestrian tracking and navigation systems, such as inertial navigation systems, often determine a location based on the relative motion of the user, for example using an IMU located in a single shoe, boot, or other footwear of the wearer. However, these single-boot systems usually only provide acceptable tracking and position information for short periods of time, typically 15 to 30 minutes. A theoretical foot-to-foot personal tracking system was proposed by Brand and Phillips, in Foot-to-Foot Range Measurement as an Aid to Personal Navigation, the disclosure of which is hereby incorporated by reference in its entirety. Brand and Phillips proposed a continuous foot-to-foot measurement system to determine the distance between each of a user's feet, thereby tracking the location of the pedestrian. Laverne et al. attempted to apply the Brand and Phillips system, reporting their results in Experimental Validation of Foot to Foot Range Measurements in Pedestrian Tracking, the disclosure of which is hereby incorporated by reference in its entirety. However, Brand and Phillips, and Laverne et al., suffer from several flaws, including inadequate RF-ranging in the foot-to-foot measurement, inadequate IMU mounting, lack of an integrated GPS receiver into the system, and inadequate filter updates to constrain navigation errors. As such, personal navigation systems proposed by Brand and Phillips and Laverne et al. remain unacceptable to use during long durations of time.

Some dead reckoning systems include RF ranging systems that may utilize a round-trip time-of-flight measurement to compute the distance between two radios, where one radio is mounted on each shoe or boot of the user. These types of systems can be further classified into "round-trip full-duplex" configurations and "round-trip half-duplex" configurations. In a round-trip full-duplex configuration, a first radio, such as an antenna, transmits a signal to a second radio, which then retransmits the same signal back to the first radio without performing any calculations using the signal. After receiving the retransmitted signal from the second radio, the first radio compares the departure time to the arrival time to calculate the round-trip signal propagation time. The system multiplies this time by the speed of light and divides by two to estimate the distance between the two radios.

In a round-trip half-duplex configuration, a first radio transmits a signal to a second radio, which then performs calculations using that signal. The second radio then transmits a new signal, which often contains the results of the calculations performed by the second radio, back to the first radio. The first radio then utilizes the data from the second radio and other data within the first radio to calculate the round-trip signal propagation time. The system multiplies this time by the speed of light and divides by two to estimate the distance between the two radios.

An improved RF-ranging technique is disclosed in U.S. Pat. No. 8,199,047 (which is assigned to the same assignee as the present patent application), the disclosure of which is hereby incorporated by reference in its entirety.

As used herein, an "antenna" refers to a device that emits, transmits and/or receives wireless signals. Such devices may be generally referred to as "emitters," "transmitters," "receivers," or "transceivers" in the art and may emit, transmit, and/or receive electromagnetic signals (such as RF signals), ultrasonic signals, subsonic signals, optical signals, acoustic signals, or other signals through the air. Such devices may be metallic or non-metallic and may include emitting elements, transmitting elements, receiving elements, and/or transceiving elements, depending on the type of signal being emitted, transmitted or received.

Although there have been some improvements in tracking technology, there remains a need for an improved portable tracking and location system that obviates or at least mitigates one or more of the shortcomings of previous techniques to allow more accurate computation of the current or real-time position of a user in a wide range of operating environments for an extended period of time.

SUMMARY

The present disclosure discusses a system and method for tracking and locating a person, animal, or machine.

According to some aspects of this disclosure, an inertial navigation system includes (i) an originator device including a first inertial measurement unit, a first processing unit, and a plurality of originator antennas including at least a first originator antenna and a second originator antenna; and (ii) a transponder device including a second inertial measurement unit, a second processing unit, and a second plurality of antennas including at least a first transponder antenna and a second transponder antenna. The first inertial measurement unit and the second inertial measurement unit may be configured to transmit IMU data to at least one of the first processing unit and the second processing unit. At least one of the first processing unit and the second processing unit may receive the IMU data and may be configured to estimate a position using the IMU data. The first originator antenna and the first transponder antenna may be separated by a first distance. The first originator antenna and the second transponder antenna may be separated by a second distance. The first originator antenna may be configured to transmit a first wireless signal to the first transponder antenna and the second transponder antenna. The first transponder antenna may be configured to transmit a second wireless signal to the first originator antenna. The first transponder antenna and the second transponder antenna may be configured to receive the first wireless signal from the first originator antenna. The first originator antenna may be configured to receive the second wireless signal from the first transponder antenna.

According to another aspect of this disclosure, at least one of the first processing unit and the second processing unit may be configured to calculate a value related to the first distance.

At least one of the first processing unit and the second processing unit may be configured to calculate a value related to the second distance. At least one of the first processing unit and the second processing unit may be configured to update the estimate of the position using the value related to the first distance and the value related to the second distance.

According to a further aspect of this disclosure, the value related to the second distance may be a first differential distance. The first differential distance may correspond to the difference between the second distance and the first distance. At least one of the first processing unit and the second processing unit may be further configured to calculate the first differential distance based on the first wireless signal received at the first transponder antenna and the second transponder antenna.

According to yet another aspect of this disclosure, the first transponder antenna and the second originator antenna may be separated by a third distance. The first transponder antenna may be further configured to transmit the second wireless signal to the second originator antenna. The second originator antenna may be further configured to receive the second wireless signal from the second transponder antenna. At least one of the first processor and the second processor may be further configured to calculate a value related to the third distance. At least one of the first processor and the second processor may be further configured to update the estimate of the position using the value related to the third distance.

According to yet another aspect of this disclosure, the value related to the third distance may be a second differential distance. The second differential distance may correspond to the difference between the third distance and the first distance. At least one of the first processing unit and the second processing unit may be further configured to calculate the second differential distance based on the second wireless signal received at the first originator antenna and the second originator antenna.

According to another aspect of this disclosure, an inertial navigation system includes (i) at least one originator device including a first inertial measurement unit, a first originator antenna, a second originator antenna, and a first processing unit; and (ii) at least one transponder device including a second inertial measurement unit, a first transponder antenna, a second transponder antenna, and a second processing unit. The first inertial measurement unit and the second inertial measurement unit are configured to transmit data to one or both of the first processing unit and the second processing unit. At least one of the first processing unit and the second processing unit may be configured to estimate a position using the data. The first originator antenna and the first transponder antenna are separated by a first distance. The first originator antenna and the second transponder antenna are separated by a second distance. The first transponder antenna and the second originator antenna are separated by a third distance. The first originator antenna may be configured to transmit a first wireless signal to the first transponder antenna and the second transponder antenna; and the first transponder antenna may be configured to transmit a second wireless signal to the first originator antenna and the second originator antenna. The first transponder antenna and the second transponder antenna may be configured to receive the first wireless signal from the first originator antenna. The first originator antenna and the second originator antenna may be configured to receive the second wireless signal from the first transponder antenna. The second processing unit may be configured to calculate a first differential distance between the second distance and the first distance based on the first wireless signal received at the first transponder antenna and the second transponder antenna. The first processing unit may be configured to calculate a second differential distance between the third distance and the first distance based on the second wireless signal received at the first originator antenna and the second originator antenna, and may be further configured to calculate the first distance. The first processing unit may be further configured to update the estimate of the position using the first distance and the first differential distance. The first processing unit may be further configured to update the estimate of the position using the second differential distance.

According to another aspect of the present disclosure, the first processing unit may be configured to estimate a position of at least one transponder device using the first distance and the first differential distance. The first processing unit may be further configured to update the position of the at least one transponder device using the second differential distance. The first processing unit may be further configured to estimate the position of at least one transponder device using a Kalman filter. The first distance and the first differential distance may be used to update at least one state of the Kalman filter. According to some aspects of the present disclosure, the update to the Kalman filter may be an unscented Kalman filter (UKF)-based update.

According to another aspect of the present disclosure, the first differential distance may be calculated by computing the difference between a first carrier phase received at the first transponder antenna and a second carrier phase received at the second transponder antenna. The second differential distance may be calculated by computing the difference between a first carrier phase received at the first originator antenna and a second carrier phase received at the second originator antenna. The second processing unit may be configured to calculate the first carrier phase by computing a first in-phase channel signal and a first quadrature channel signal based on the first wireless signal received by the first transponder antenna. The second processing unit may be further configured to calculate the second carrier phase by computing a second in-phase channel signal and a second quadrature channel signal based on the first wireless signal received by the second transponder antenna. The first carrier signal may be calculated by calculating the arctangent of the first quadrature signal over the first in-phase channel signal, and the second carrier signal may be calculated by calculating the arctangent of the second quadrature signal over the second in-phase channel signal. According to another aspect of the present disclosure, the carrier phase difference may be calculated as a baseband phase difference.

According to yet another aspect of this disclosure, a method for estimating a position includes receiving first IMU data from a first inertial measurement unit; receiving second IMU data from a second inertial measurement unit; estimating a position of a transponder device using at least one of the first IMU data and the second IMU data; transmitting a first wireless signal using a first originator antenna of an originator device to a first transponder antenna and a second transponder antenna of the transponder device; receiving the first wireless signal at the first transponder antenna and the second transponder antenna of the transponder device; and calculating a first differential distance, based on the first wireless signal received at the first transponder antenna and the second transponder antenna, in a processing unit of the transponder device. The first differential distance may be the difference between a first distance and a second distance. The first distance may be the distance between the first originator antenna and the first transponder antenna. The second distance may be the distance between the first originator antenna and the second transponder antenna. The method may further include transmitting a second wireless signal using the first transponder antenna of the transponder device to the first originator antenna and a second originator antenna of the originator device; receiving the second wireless signal at the first originator antenna and the second originator antenna of the originator device; calculating the first distance in a processing unit of the originator device; and calculating a second differential distance, based on the second wireless signal received at the first originator antenna and the second originator antenna, in the processing unit of the originator device. The second differential distance may be the difference between the first distance and a third distance. The third distance may be the distance between the first transponder antenna and the second originator antenna. The processing unit of the originator device may be configured to update the estimate of the position using at least one of the first distance, the first differential distance, and the second differential distance. The estimate of the position may be an estimate of the position of the transponder device.

According to another aspect of this disclosure, the method may include estimating of the position of the transponder device based on a Kalman filter. Estimating of the position of the transponder device may further include updating at least one state of the Kalman filter using the first distance and the first differential distance. Updating the Kalman filter may include using an unscented Kalman filter (UKF)-based update. The Kalman filter may be a hybrid extended Kalman filter and unscented Kalman filter.

According to still a further aspect of this disclosure, calculating the first differential distance may include computing the difference between a first carrier phase received at the first transponder antenna and a second carrier phase received at the second transponder antenna. Calculating the first differential distance further may include calculating the first carrier phase by computing a first in-phase channel signal and a first quadrature channel signal based on the first wireless signal received by the first transponder antenna. Calculating the second carrier phase may include computing a second in-phase channel signal and a second quadrature channel signal based on the first wireless signal received by the second transponder antenna. Calculating the first carrier phase may further include calculating the arctangent of the first quadrature channel signal over the first in-phase channel signal, and calculating the second carrier signal may include calculating the arctangent of the second quadrature channel signal over the second in-phase channel signal.

According to still another aspect of this disclosure, the method may include determining whether at least one of the first inertial measurement unit and the second inertial measurement unit is in a zero-velocity condition. Determining whether at least one of the first inertial measurement unit and the second inertial measurement unit is in a zero-velocity condition may include rotating at least one of the first IMU data and the second IMU data to a level frame to create rotated data; applying a first window length to the rotated data; calculating a first rotated standard deviation for the rotated data within the first window length; determining whether the first rotated standard deviation is less than a first window threshold value; and performing a zero-velocity-based update to a Kalman filter when the first rotated standard deviation is less than the first window threshold value.

According to a further aspect of the disclosure, determining whether at least one of the first inertial measurement unit and the second inertial measurement unit is in a zero-velocity condition may further include determining a second window length and a second window threshold value if the first rotated standard deviation is not less than the first window threshold value; applying the second window length to the rotated data; calculating a second rotated standard deviation for the rotated data within the second window length; determining whether the second rotated standard deviation is less than the second window threshold value; and performing a zero-velocity-based update to a Kalman filter when the second rotated standard deviation is less than the second window threshold value. The second window length may be less than the first window length. The second window threshold value may be greater than the first window threshold value.

According to still a further aspect of the disclosure, at least one of the first IMU data and the second IMU data may include gyroscopic data, accelerometer data, gyroscopic deviation data, and accelerometer deviation data. Determining whether at least one of the first inertial measurement unit and the second inertial measurement unit is in a zero-velocity condition may include, before the rotating to the level frame, calculating a gyroscopic magnitude residual and calculating an accelerometer magnitude residual. The gyroscopic magnitude residual may be the difference between a magnitude of the gyroscopic data and a magnitude of the Earth's rotation rate. The accelerometer magnitude residual may be the difference between a magnitude of the accelerometer data and a magnitude of gravity. Performing the rotating to the level frame may occur when the gyroscopic magnitude residual is less than a predetermined gyroscopic magnitude threshold, when the accelerometer magnitude residual is less than a predetermined accelerometer magnitude threshold, when at least one of the gyroscopic deviation data is not less than a gyroscopic deviation threshold, and when the accelerometer deviation data is not less than an accelerometer deviation threshold.

According to still another aspect of this disclosure, a method for performing a carrier phase difference measurement includes transmitting a first wireless signal using a first originator antenna of an originator device to a first transponder antenna and a second transponder antenna of the transponder device; receiving the first wireless signal at the first transponder antenna and the second transponder antenna of the transponder device; and calculating a first differential distance, based on the first wireless signal received at the first transponder antenna and the second transponder antenna. The first differential distance may be the difference between a first distance and a second distance. The first distance may be the distance between the first originator antenna and the first transponder antenna. The second distance may be the distance between the first originator antenna and the second transponder antenna. The method may also include transmitting a second wireless signal using the first transponder antenna of the transponder device to the first originator antenna and a second originator antenna of the originator device; receiving the second wireless signal at the first originator antenna and the second originator antenna of the originator device; calculating the first distance; and calculating a second differential distance, based on the second wireless signal received at the first originator antenna and the second originator antenna. The method may also include estimating a position using the first distance, the first differential distance, the second differential distance. The second differential distance may be the difference between the first distance and a third distance. The third distance may be the distance between the first transponder antenna and the second originator antenna.

According to another aspect of the disclosure, calculating of the first differential distance may include computing the difference between a first carrier phase received at the first transponder antenna and a second carrier phase received at the second transponder antenna. Calculating of the first differential distance may further include calculating the first carrier phase by computing a first in-phase channel signal and a first quadrature channel signal based on the first wireless signal received by the first transponder antenna. Calculating the second carrier phase may include computing a second in-phase channel signal and a second quadrature channel signal based on the first wireless signal received by the second transponder antenna. Calculating the first carrier phase may include calculating the arctangent of the first quadrature channel signal over the first in-phase channel signal. Calculating the second carrier signal may include calculating the arctangent of the second quadrature channel signal over the second in-phase channel signal.

According to still another aspect of this disclosure, calculating the first differential distance may include calculating the difference between a first baseband phase of the first wireless signal received at the first transponder antenna and a second baseband phase of the second transponder antenna. The first baseband phase may be computed based on the first wireless signal received at the first transponder antenna, and the second baseband phase may be computed based on the first wireless signal received at the second transponder antenna.

According to still another aspect of this disclosure, a method of performing an update to a Kalman filter includes calculating a first estimated transponder position of a first transponder antenna based on IMU data received from an inertial measurement unit; calculating a second estimated transponder position of a second transponder antenna; calculating a first estimated distance between the first estimated transponder position and a first onginator antenna position; calculating a second estimated distance between the second estimated transponder position and the first originator antenna position; and calculating a first estimated differential distance. The first estimated differential distance may be the difference between the first estimated distance and the second estimated distance. The method may further include measuring a first transponder distance between a first originator antenna and the first transponder antenna by performing a first distance measurement using the first originator antenna and the first transponder antenna; and measuring a second transponder distance between the first originator antenna and the second transponder antenna by performing a second distance measurement using the first originator antenna and the second transponder antenna. The method may further include calculating a first measured differential distance; calculating a new value for the first estimated differential distance; and determining a new value for the second estimated transponder position using the new value for the first estimated differential distance. The first measured differential distance may be the difference between the first transponder distance and the second transponder distance.

According to another aspect of this disclosure, determining a new value for the second estimated transponder position using the new value for the first estimated differential distance may include applying an unscented Kalman filter to the first estimated transponder position. Applying the unscented Kalman filter may include determining a first set of sigma points corresponding to the first estimated transponder position, calculating a first updated transponder position using the first set of sigma points and the first estimated transponder position, calculating a new first estimated distance using the first set of sigma points and the first updated transponder position, and calculating the new value for the second estimated transponder position using the new first estimated distance.

According to still another aspect of the disclosure, calculating a new value for the second estimated transponder position using the new first estimated distance may include determining a second set of sigma points corresponding to the second estimated transponder position; calculating a second updated transponder position using the second set of sigma points and an offset distance between the first transponder antenna and the second transponder antenna; and calculating the new value for the first estimated differential distance using the second updated transponder position and the new first estimated distance. Calculating the new value for the first estimated differential distance using the second updated transponder position and the new first estimated distance may include determining a third set of sigma points corresponding to the first originator antenna position; calculating a first updated originator position using the third set of sigma points and the first originator antenna position; calculating a new second estimated distance based on the difference between the first updated originator position and the second updated transponder position; and calculating the new value for the first estimated differential distance. The new value for the first estimated differential distance may be based on the difference between the new second estimated distance and the new first estimated distance.

According to still a further aspect, the first originator antenna position may be an estimate of the actual position of the first originator antenna.

According to still another aspect, the method may use the new value for the second estimated transponder position as an update for the Kalman filter.

According to still another aspect of this disclosure, a method for detecting a zero-velocity condition includes receiving an IMU data packet from an inertial measurement unit. The IMU data packet may include accelerometer data and gyroscopic data. The accelerometer data and gyroscopic data may be defined by an IMU reference frame. The IMU reference frame may correspond to at least a first axis of the inertial measurement unit, a second axis of the inertial measurement unit, and a third axis of the inertial measurement unit. The method may include calculating an accelerometer residual value based on the accelerometer data; calculating a gyroscopic residual value based on the gyroscopic data; determining whether the accelerometer residual value is less than a first accelerometer threshold; and determining whether the gyroscopic residual value is less than a first gyroscopic threshold. The gyroscopic residual value may be the difference between a magnitude of the gyroscopic data and a magnitude of the Earth's rotation rate. The accelerometer residual value may be the difference between a magnitude of the accelerometer data and a magnitude of gravity.

The method may further include, if the accelerometer residual value is less than the first accelerometer threshold and the gyroscopic residual value is less than the gyroscopic threshold, calculating an accelerometer standard deviation based on the accelerometer data; calculating a gyroscopic standard deviation based on the gyroscopic data; and determining whether the accelerometer standard deviation is less than a first accelerometer deviation threshold. The method may further include determining whether the gyroscopic standard deviation is less than a first gyroscopic deviation threshold.

According to still another aspect of this disclosure, the method may further include, if the accelerometer standard deviation is not less than the first accelerometer deviation threshold or if the gyroscopic standard deviation is not less than the first gyroscopic deviation threshold, defining a new reference frame; transforming at least one of the accelerometer data and the gyroscopic data from the IMU reference frame to the new reference frame; and determining whether the inertial measurement unit is in a zero-velocity condition based on at least one of the transformed accelerometer data and the transformed gyroscopic data. The new reference frame may be defined by at least one axis in a direction parallel to the direction of gravity.

According to still another aspect of the disclosure, the method may include applying a first window to determine a first plurality of data samples of the transformed accelerometer data; calculating a first transformed accelerometer standard deviation based on the first plurality of data samples; determining whether the first transformed accelerometer standard deviation is less than a first window threshold value; and performing a zero-velocity update if the first transformed accelerometer standard deviation is less than the first window threshold value.

According to still another aspect of this disclosure, the method may further include, applying a second window to determine a second plurality of data samples of the transformed accelerometer data, if the first transformed accelerometer standard deviation is not less than the first window threshold value. The method may further include calculating a second transformed accelerometer standard deviation based on the second plurality of data samples; determining whether the second transformed accelerometer standard deviation is less than a second window threshold value; and performing a zero-velocity update if the second transformed accelerometer standard deviation is less than the second window threshold value. The second window may be less than the first window. The second window threshold value may be greater than the first window threshold value.

According to still another aspect, the method may include determining whether a second window can be applied to the transformed accelerometer data, if the first transformed accelerometer standard deviation is not less than the first window threshold value. If the second window can be applied to the transformed accelerometer data, the method may include, applying the second window to determine a second plurality of data samples of the transformed accelerometer data; calculating a second transformed accelerometer standard deviation based on the second plurality of data samples; determining whether the second transformed accelerometer standard deviation is less than a second window threshold value; and performing a zero-velocity update if the second transformed accelerometer standard deviation is less than the second window threshold value. Calculating the accelerometer residual value may include calculating a difference between the magnitude of at least a portion of the accelerometer data and a magnitude of a gravitational value. Calculating the gyroscopic residual value may include calculating a difference between a magnitude of the gyroscopic data and a magnitude of the Earth's rotation.

According to still another aspect of the disclosure, a method for detecting a zero-velocity condition includes receiving an IMU data packet from an inertial measurement unit. The IMU data packet may include accelerometer data and gyroscopic data. The accelerometer data and gyroscopic data may be defined by an IMU reference frame. The IMU reference frame may correspond to at least a first axis of the inertial measurement unit, a second axis of the inertial measurement unit, and a third axis of the inertial measurement unit. The method may further include defining a new reference frame. The new reference frame may be defined by at least one axis in a direction parallel to the direction of gravity. The method may include transforming at least one of the accelerometer data and the gyroscopic data from the IMU reference frame to the new reference frame; and determining whether the inertial measurement unit is in a zero-velocity condition based on at least one of the transformed accelerometer data and the transformed gyroscopic data.

According to still another aspect of the disclosure, the method may include applying a first window to determine a first plurality of data samples of the transformed accelerometer data; calculating a first transformed accelerometer standard deviation based on the first plurality of data samples; determining whether the first transformed accelerometer standard deviation is less than a first window threshold value; and performing a zero-velocity update if the first transformed accelerometer standard deviation is less than the first window threshold value. If the first transformed accelerometer standard deviation is not less than the first window threshold value; the method may include applying a second window to determine a second plurality of data samples of the transformed accelerometer data. The method may include calculating a second transformed accelerometer standard deviation based on the second plurality of data samples; determining whether the second transformed accelerometer standard deviation is less than a second window threshold value; and performing a zero-velocity update if the second transformed accelerometer standard deviation is less than the second window threshold value.

According to still another aspect of the disclosure, the method may further include determining whether a second window can be applied to the transformed accelerometer data, if the first transformed accelerometer standard deviation is not less than the first window threshold value. If the second window can be applied to the transformed accelerometer data, the method may include applying the second window to determine a second plurality of data samples of the transformed accelerometer data; calculating a second transformed accelerometer standard deviation based on the second plurality of data samples; determining whether the second transformed accelerometer standard deviation is less than a second window threshold value; and performing a zero-velocity update if the second transformed accelerometer standard deviation is less than the second window threshold value.

According to still another aspect of the disclosure, a first inertial navigation system device may include a first inertial measurement unit configured to output first IMU data; a first antenna; and a second antenna. The first antenna may be configured to transmit a first wireless signal to a plurality of antennas on a second inertial navigation system device. The first antenna and the second antenna may be configured to receive a second wireless signal from at least a first antenna in the plurality of antennas on the second navigation device. The device may include a memory and a processor configured to communicate with the memory and to use the first IMU data and the second wireless signal to estimate the position of the second inertial navigation system device.

According to still another aspect of the disclosure, the device includes a first global positioning satellite antenna and a global positioning satellite receiver. The global positioning satellite receiver is configured to communicate with the processor. The processor is further configured to use data received from the global positioning satellite receiver to estimate the position of the second inertial navigation system device. The device may further include a wireless transceiver configured to wirelessly receive data packets from the second inertial navigation system device. The data packets may include second IMU data corresponding to a second inertial measurement unit mounted on the second inertial navigation system device. The data packets may include GPS data corresponding to a second global positioning satellite antenna mounted on the second inertial navigation system device.

According to another aspect, the first inertial navigation system device may be mounted to an article of footwear, which may be worn by a human.

According to another aspect of the disclosure, the first antenna may be rigidly coupled to the second antenna. The first inertial measurement unit may be configured to output the first IMU data. The first IMU data may be defined by a first axis, a second axis, and a third axis. The first axis may be oriented in a first direction at an angle of about forty-five degrees to the ground. The second axis may be oriented in a second direction, orthogonal to the first direction, at an angle of about forty-five degrees to the ground. The third axis may be oriented in a third direction, orthogonal to the first direction and the second direction, at an angle parallel to the ground.

According to some aspects, the processor may be further configured to calculate a range measurement between the first antenna and at least the first antenna in the plurality of antennas on the second inertial navigation device. The processor may be further configured to calculate a first carrier phase difference measurement between the second antenna and the first antenna in the plurality of antennas on the second inertial navigation device, and to update at least one inertial navigation equation using at least one of the range measurement and the first carrier phase difference measurement. The processor may be further configured to extract information relating to a second carrier phase difference measurement from the second wireless signal. The second carrier phase difference measurement may correspond to at least a portion of a distance between the first antenna and a second antenna in the plurality of antennas on the second navigation device. The processor may be further configured to update at least one inertial navigation equation using the second carrier phase difference measurement.

According to another aspect of the disclosure, the processor may be further configured to calculate the first carrier phase difference measurement by computing the difference between a first carrier phase received at the first antenna and a second carrier phase received at the second antenna. The processor may be further configured to calculate the first carrier phase by computing a first in-phase channel signal and a first quadrature channel signal based on the second wireless signal received by the first antenna, and to calculate the second carrier phase by computing a second in-phase channel signal and a second quadrature channel signal based on the second wireless signal received by the second antenna. The first carrier signal may be calculated by calculating the arctangent of the first quadrature channel signal over the first in-phase channel signal. The second carrier signal may be calculated by calculating the arctangent of the second quadrature channel signal over the second in-phase channel signal. According to another aspect of the disclosure, the processor may be configured to calculate the first carrier phase difference measurement by subtracting a first carrier phase of the second wireless signal received at the first antenna and a second carrier phase of the second wireless signal received at the second antenna.

According to another aspect of the disclosure, the processor may be configured to determine whether the first inertial measurement unit is in a zero-velocity condition.

According to still another aspect of the disclosure, a method for updating a set of inertial navigation equations includes: receiving, in a processor, IMU data from an inertial measurement unit; determining in the processor whether the inertial measurement unit is in a zero-velocity condition; performing in the processor an extended Kalman filter-based update to at least one state of the inertial navigation equations, if the processor determines that the inertial measurement unit is in a zero-velocity condition; determining in the processor whether a frozen azimuth-type update can be performed based on frozen azimuth criteria, if the inertial measurement unit is in a zero-velocity condition, and performing an extended Kalman filter-based update to at least one state of the inertial navigation equations if the frozen azimuth criteria is satisfied; determining in the processor whether a compass-type update can be performed based on compass criteria, if the inertial measurement unit is in a zero-velocity condition, and performing an extended Kalman filter-based update to at least one state of the inertial navigation equations if the compass criteria is satisfied; determining in the processor whether a global positioning-type update can be performed based on global positioning criteria and received global positioning data, and performing an extended Kalman filter-based update to at least one state of the inertial navigation equations if the global positioning criteria is satisfied, determining in the processor whether a ranging-type update can be performed based on ranging criteria and received ranging data, and performing at least one ranging-type update using an unscented Kalman filter-based update to at least one state of the inertial navigation equations if the ranging criteria is satisfied; updating the inertial navigation equations using the processor based on at least one of the updated states; and determining in the processor an estimated position using the IMU data and at least one of the updated states.

According to another aspect of this disclosure, the processor may determine whether the inertial measurement unit is in a zero-velocity condition. The processor may determine whether the frozen azimuth-type update can be performed based on the frozen azimuth criteria including determining whether a predefined period of time has passed since a preceding frozen azimuth-type update was performed. The processor may determine whether the compass-type update can be performed based on the compass criteria including determining whether magnetometer data has been passed through a compass filter during a time period when the inertial measurement unit is in the zero-velocity condition. The processor may determine whether the global positioning-type update can be performed based on the global positioning criteria and the received global positioning data including determining whether the global positioning data includes pseudorange measurement data. The global positioning data may also include position and time solutions.

According to another aspect of this disclosure, performing the ranging-type update includes calculating a first estimated transponder position of a first transponder antenna based on the IMU data; calculating a second estimated transponder position of a second transponder antenna; calculating a first estimated distance between the first estimated transponder position and a first originator antenna position; calculating a second estimated distance between the second estimated transponder position and the first originator antenna position; calculating a first estimated differential distance; measuring a first transponder distance between a first originator antenna and the first transponder antenna by performing a first distance measurement using the first originator antenna and the first transponder antenna; measuring a second transponder distance between the first originator antenna and the second transponder antenna by performing a second distance measurement using the first originator antenna and the second transponder antenna; calculating a first measured differential distance; calculating a new value for the first estimated differential distance; and determining a new value for the second estimated transponder position using the new value for the first estimated differential distance. The first estimated differential distance may be the difference between the first estimated distance and the second estimated distance. The first measured differential distance may be the difference between the first transponder distance and the second transponder distance.

According to still another aspect of the disclosure, a method for determining a frequency for transmission includes (a) scanning a first plurality of frequencies at an originator antenna of an originator device; (b) determining whether at least one transmitted wireless signal from another antenna is present on at least one frequency in the first plurality of frequencies; (c) selecting a first frequency in the first plurality of frequencies based on the determining; and (d) transmitting a first data packet on the first frequency from the originator antenna to a transponder antenna of a transponder device. Selecting a first frequency may include selecting a first frequency when a processor determines that the first frequency does not have a transmitted wireless signal from another antenna present. The method may further include monitoring the first plurality of frequencies at the transponder antenna of a transponder device; receiving the first data packet from the originator antenna on the first frequency; and transmitting a second data packet, based on the first data packet, on the first frequency from the transponder antenna to the originator antenna.

According to another aspect of the disclosure, determining whether at least one transmitted wireless signal from another antenna is present may include determining an interference value for each frequency in the plurality of frequencies. The interference value may indicate whether at least one transmitted wireless signal from another antenna is present. Selecting a first frequency in the first plurality of frequencies based on the determining may include selecting the first frequency based on the interference value of the first frequency. The interference value of the first frequency may be lower than the interference value of each other frequency.

According to another aspect of the disclosure, the method may include monitoring the first plurality of frequencies at the transponder antenna of a transponder device; receiving the first data packet from the originator antenna on the first frequency; and transmitting a second data packet, based on the first data packet, on the first frequency from the transponder antenna to the originator antenna. The first data packet may include a measurement request signal. The second data packet may include a response data packet to the measurement request signal.

According to still another aspect of the disclosure, the method may include monitoring the first frequency at the originator antenna after transmitting the first data packet; determining whether interference is present on the first frequency; scanning the first plurality of frequencies at the originator antenna of the originator device; determining whether at least one transmitted wireless signal from another antenna is present on at least one frequency in the first plurality of frequencies; selecting a second frequency in the plurality of frequencies based on the determining; and transmitting a third data packet on the second frequency from the originator antenna to the transponder antenna. The method may include monitoring the first plurality of frequencies at the transponder antenna of a transponder device if interference is present on the first frequency; receiving the third data packet from the originator antenna on the second frequency; and transmitting a fourth data packet, based on the third data packet, on the second frequency from the transponder antenna to the originator antenna.

According to another aspect of the disclosure, a method includes determining in a processor whether a high shock event has occurred in a first inertial measurement unit of an inertial navigation system; and performing a reset of the first inertial measurement unit if the processor determines that the high shock event has occurred. Determining whether a high shock event has occurred may include determining in the processor whether a first accelerometer data from a first inertial measurement unit exceeds an accelerometer threshold value; and determining that the high shock event has occurred if the first accelerometer data exceeds the accelerometer threshold value. Determining whether a high shock event has occurred may include determining in the processor whether a first accelerometer data from a first inertial measurement unit exceeds an accelerometer threshold value; determining in the processor whether a first gyroscopic data from the first inertial measurement unit exceeds a gyroscopic threshold value; and determining that the high shock event has occurred when the first accelerometer data exceeds the accelerometer threshold value and the first gyroscopic data does not exceed the gyroscopic threshold.

According to still a further aspect of the disclosure, performing the reset may include updating a position estimate of a second inertial measurement unit using a second accelerometer data and a second gyroscopic data received by a second inertial measurement unit; and maintaining a position estimate of the first inertial measurement unit at a last estimated position before the first accelerometer data exceeded the accelerometer threshold. Maintaining a position estimate of the first inertial measurement unit may include maintaining a position value and a velocity value for the first inertial measurement unit; and updating an attitude value for the first inertial measurement unit using inertial navigation equations. Performing the reset may also include determining whether the high shock event has ended; resetting the velocity value of the first inertial measurement unit to zero if the high shock event has ended; and updating the position estimate of the first inertial measurement using the inertial measurement equations. Determining whether the high shock event has ended may include determining whether a predetermined period of time has passed since the high shock event began. Determining whether the high shock event has ended may include testing whether a second accelerometer data exceeds the accelerometer threshold value; and determining that the high shock event has ended if the second accelerometer data does not exceed the accelerometer threshold value. Performing the reset may also include increasing a position error value for the first inertial measurement unit; increasing a velocity error value for the inertial measurement unit; and updating the position estimate using the increased position error value and the increased velocity value.

BRIEF DESCRIPTION OF THE DRAWINGS

FIG. 28 is a block diagram of the exemplary pedestrian tracking system of FIG. 1.

It is to be understood that both the foregoing general description and the following detailed description are exemplary and explanatory only and are not restrictive of the scope of the invention as claimed.

Description Of The Disclosed Embodiments

Figure 1:
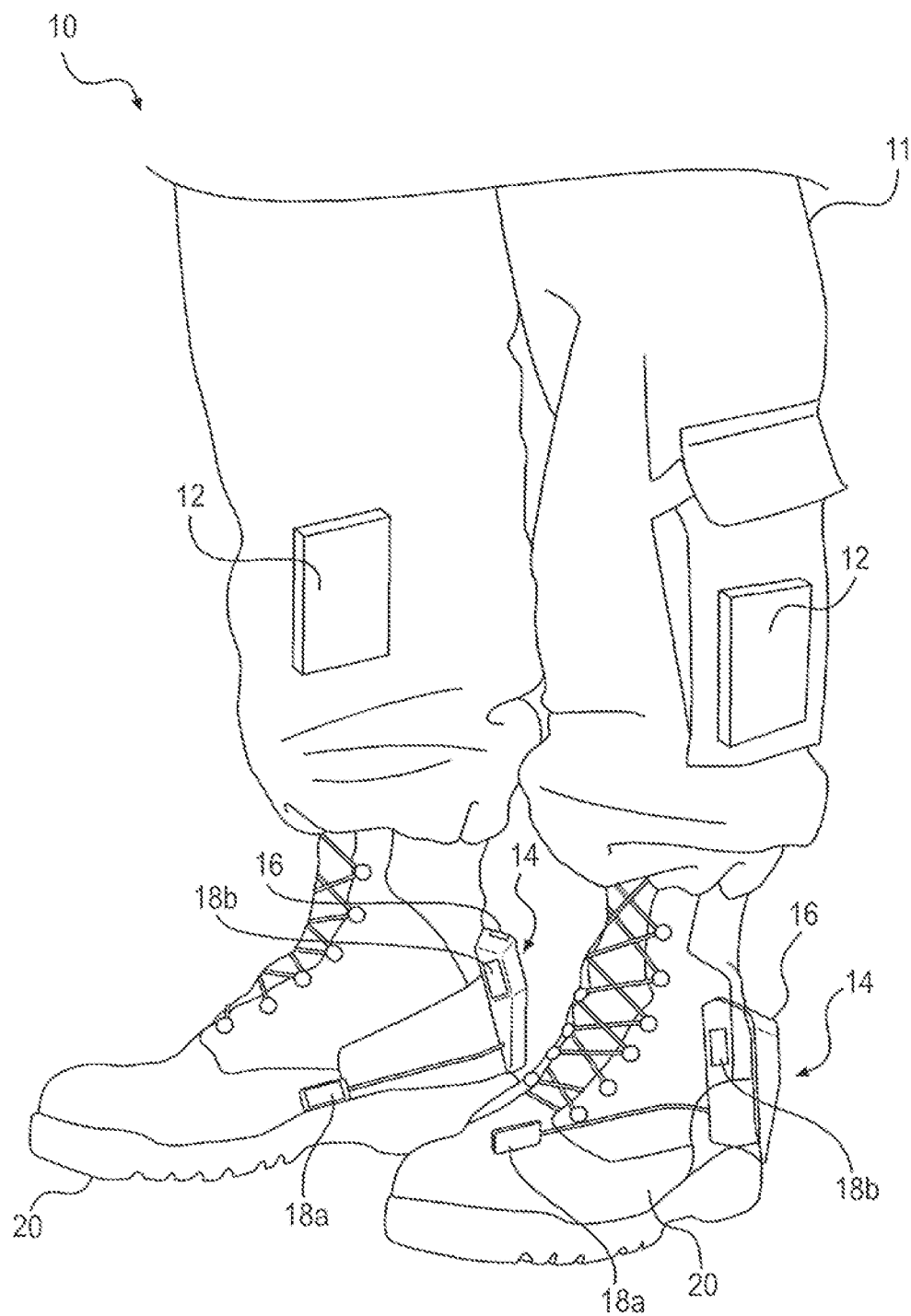
FIG. 1 is a diagram of an exemplary tracking system as worn by an exemplary user.

Referring to FIG. 1, an exemplary embodiment of an inertial tracking system 10 is shown on a user 11. System 10 includes processing units 12 and sensor units 14. Each sensor unit 14 is attached to the user 11. According to some embodiments, each sensor unit 14 may be attached to a respective shoe or boot 20 of user 11. Although FIG. 1 shows each sensor unit 14 attached to a shoe or boot 20, it is contemplated that sensor unit 14 may be attached directly to user's 11 foot, ankle, or clothing. It is also contemplated that system 10, including sensor units 14, may be attached to animals, such as the feet of a rescue dog, or to machines, such as a robot having a walking motion in which sensor units 14 move relative to each other in a way that can be measured in the manner described herein. To facilitate the examples in this disclosure, an exemplary system 10 is described in relation to a pedestrian, although it is contemplated that similar devices may be used on non-pedestrians, on animals, or on machines. For example, exemplary system 10 could be attached to rescue dogs or horses. It could similarly be integrated into machines, such as bipedal or multi-pedal robots. It is also contemplated that exemplary system 10 could be integrated into tracked vehicles, such as built into the links of the tracks themselves, for example, because the links of the tracks enter zero-velocity states during vehicular motion.

Sensor units 14 include GPS antennas 16 and distance measuring radio "DMR" antennas 18a and 18b. DMR antennas 18a and 18b may be collectively referred to as DMR antennas 18 when the antennas are not being distinguished from one another. On each shoe or boot 20, GPS antenna 16 and DMR antennas 18 may be integrated into a single enclosure in each sensor unit 14, or may be separately mounted to the shoe or boot 20 in a different enclosure. Sensor unit 14 also includes an IMU (not shown) and DMC (not shown). The IMU and DMC may be integrated into one enclosure, such as in the nanoIMU (nIMU) or the MEMSense H3, commercially available from MEMSense of Rapid City, S. Dak. When IMU and DMC are integrated, transmission of IMU data packets and DMC data packets may be synchronized. FIG. 2A shows exemplary sensor unit 14 isolated from the user 11.

Although DMR antennas 18 are described as distance measuring "radio" antennas, it is understood that DMR antennas 18 may emit, transmit, and/or receive electromagnetic, ultrasonic, subsonic, acoustic, optical, or other signals through the air. DMR antennas 18 may be emitters, transmitters, receivers, or transceivers, as described above.

GPS antenna 16 may be any transmitter, receiver, or transceiver for use with any global navigation satellite system (GNSS). Examples of GNSS systems include, but are not limited to, global positioning systems (GPS), GLONASS, GALILEO, COMPASS, and quasi-zenith satellite systems (QZSS).

Although FIGS. 1, 2A, 2B, 4A, and 4B are shown having two DMR antennas 18 on each sensor unit 14, it is contemplated that sensor units 14 may include more than two DMR antennas 18. It is understood that this disclosure can be applied to systems having more than two antennas using the methods disclosed herein.

Although user 11 of FIG. 1 is shown wearing boots 20, it is contemplated that other forms of footwear may be used in some embodiments, for example shoes or snow shoes. It is also contemplated that some embodiments of the disclosed system may be integrated directly into user's 11 clothing and footwear, while some embodiments of the disclosed system may be separate from the user's 11 clothing and may be coupled to the user's 11 clothing and/or footwear via fasteners such as straps, snaps, adhesives, or mounting brackets. Other fasteners are also contemplated.

Although user 11 is shown as human, it is contemplated that some embodiments of system 10 may be used with service animals, such as rescue dogs or horses. As explained above, some embodiments of system 10 may be used with bipedal or multi-pedal machines or tracked vehicles. For human or bipedal machines users, one sensor unit may be attached to each foot of user 11, utilizing two sensor units as described below. However, for non-bipedal users, such as dogs, horses, machines having more than two legs, or tracked vehicles, it is contemplated that more than two sensor units 14 may be implemented in system 10. According to some embodiments, for quadrupedal animals, such as dogs or horses, four sensor units 14 may be used, one on each foot of the dog or horse. It is also contemplated that only two sensor units 14 could be used when system 10 is mounted on a quadrupedal animal. On tracked vehicles, the number of sensor units 14 may vary. For example, a small robot used by first responders may include two, four, or six sensor units 14, having one, two, or three units on each track assembly. For larger vehicles, such as tanks, more sensor units 14 may be used.

As shown in FIGS. 1 and 2A, each sensor unit 14 includes at least two DMR antennas 18a and 18b positioned at two separate locations of shoe or boot 20. It is contemplated that DMR antennas 18a and 18b on sensor unit 14 may be positioned at different locations, for example, DMR antenna 18a may be positioned near the toe or forefoot while DMR antenna 18b may be positioned near the heel. It is contemplated that the position of DMR antennas 18a and 18b may be chosen to minimize the effects of flexure from the user's foot, which may change the distance between DMR antennas 18a and 18b. For example, DMR antenna 18a may be positioned near the midsole in some embodiments to mitigate the distance changes between the heel and forefoot that occur because of flexing in shoe or boot 20 during walking or running. According to some embodiments, DMR antennas 18a and 18b of each shoe or boot 20 are rigidly coupled, for example, on a rigid substrate or by a rigid connector. Rigid coupling maintains a constant, known distance between DMR antennas 18a and 18b on each shoe or boot 20, thereby mitigating errors that could result from flexing of shoe or boot 20. Distance measurements between DMR antennas 18a and 18b will be described in further detail below. According to some embodiments, each sensor unit 14 may include more than two DMR antennas 18.

As used herein, "toe," "forefoot," "midsole," and "heel" are used to facilitate description of certain exemplary embodiments. Such descriptions are not limiting of the disclosure and it is contemplated that these terms may denote relative positions of the respective device elements discussed to facilitate description herein.

DMR antennas 18 may have any polarization, although preferred embodiments include circular polarizations. As described below, the use of two DMR antennas 18 on each foot allows for more accurate and efficient tracking of a pedestrian. Although vertically polarized or horizontally polarized antennas may be acceptable for DMR antennas 18, they may suffer from reduced signal strength as a user walks or runs due to effective cross-polarization that can occur as a user's 11 foot moves during the walking or running cycle. For example, one of user's 11 feet may rotate relative to the other, creating an effective cross-polarization situation between the two feet. Circularly polarized antennas benefit from the characteristic that the orientation of the antenna is not materially affected by the orientation of the DMR antenna 18 during motion. Circularly polarized antennas may also be less susceptible to multipath interference, such as ground reflections.

According to some embodiments, DMR antennas 18 have a free space radiation pattern in which the primary lobe is directed in the direction of the corresponding shoe or boot 20. For example, DMR antennas 18a and 18b of the left shoe or boot 20, may have primary free space radiation pattern in which the primary lobe is directed towards right shoe or boot 20. The maximum gain and beam width may be chosen depending on the requirements for system 10.

According to some embodiments, DMR antennas 18 are patch antennas. According to some embodiments, DMR antennas 18 may be multiple-input multiple-output (MIMO) antennas.

GPS antennas 16 may be positioned on shoe or boot 20 as part of sensor units 14, as shown in FIGS. 1 and 2A, rather than on user's 11 torso or shoulder. Although GPS units 16 are shown positioned near the heel of shoe or boot 20, it is contemplated that the GPS units 16 may be positioned elsewhere, such as near the forefoot or mid-sole of the user's 11 foot. The received position of GPS antenna 16 directly corresponds to each sensor unit 14 rather than an approximation. As a result, positioning GPS units 16 on each shoe or boot 20 is beneficial over conventional shoulder or torso positioning because each shoe or boot 20, and consequentially each sensor unit 14, receives GPS data directly, increasing the accuracy of GPS measurements.

Sensor units 14 are operatively connected to processing units 12, for example by a wire or a wireless connection (not shown). It is contemplated that processing units 12 may be integrated into sensor units 14 or may be located remotely from sensor units 14. Processing units 12 may include a digital signal processor, discussed below, and a battery pack (not shown). Although no specific position is required for sensor units 14, the IMU and DMC may be mounted such that the IMU enters a zero-velocity condition to allow various filtering functions during various modes of movement (such as walking, crawling, or running). This zero-velocity condition allows various filtering functions, described below, to occur. Although system 10 is preferably implemented using an industrial-grade IMU, any grade IMU could be used.

Figure 2B:
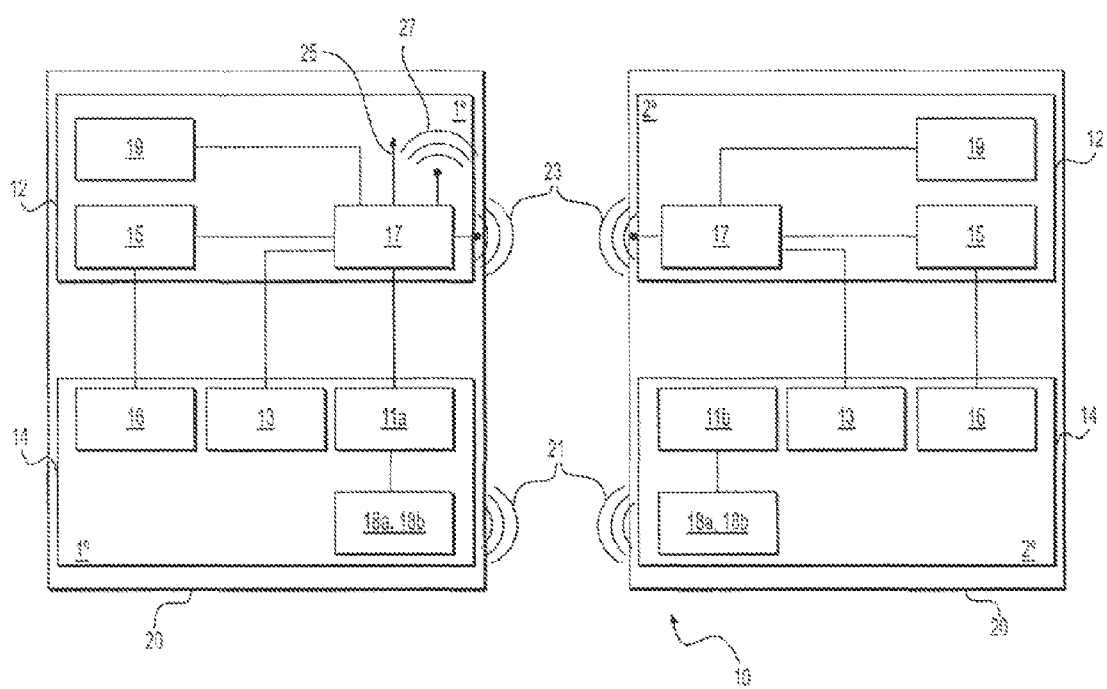
FIG. 2A is a schematic of an exemplary sensor unit of the pedestrian tracking system of FIG. 1.

FIG. 2B shows an exemplary system architecture for system 10. Similar to FIG. 1, FIG. 2B depicts two processing units 12 and two sensor units 14. It is understood that in FIG. 2B, one of each sensor units 14 is located on each shoe or boot 20 of FIG. 1. Sensor units 14 include DMR antennas 18a and 18b, DMR originator 11a and/or DMR transponder 11b, IMUs 13, and GPS antennas 16. As previously explained, DMR antennas 18a and 18b are separate antennas, but have been consolidated into a single box for purposes of FIG. 2B. Similarly, DMR originator 11a and DMR transponder 11b are described as an "originator" and a "transponder" to facilitate the description in this specification. It is contemplated that DMR originator 11a and DMR transponder 11b may represent the same or similar components, which may function as either an originator or a transponder, or both. As used herein, "originator" refers generally to the sensor unit 14 that originates a round-trip time-of-flight measurement signal, and "transponder" generally refers to the sensor unit 14 that receives the signal sent from the originator and serves as the intermediate unit in a round-trip time-of-flight measurement. DMR antennas 18 transmit wireless signals 21, which may be used to calculate the distance between the DMR antennas 18, such as range measurement 22 and/or CPD measurement 24 (not shown in FIG. 2B), described in further detail below. Wireless signals 21 may be, for example a 5.8 GHz or 2.4 GHz ranging signal.

Processing units 12 also include GPS receivers 15, which are coupled to GPS antennas 16 of sensor units 14. Processing units 12 also include a processor 17, which is coupled to IMU 13, GPS receiver 15, and DMR originator 11a or transponder 11b. Processor 17 may also be coupled to a memory 19. According to some embodiment, processors 17 of shoe or boot 20 may communicate through connection 23, which may be a wireless or wired connection. For example, connection 23 may be a Bluetooth data link or other short range communication signal. Processors 17 may also include an external communication links 25 and/or 27. Communication links 25 and 27 may be a wired link, such as a USB connection, or a wireless link, such as an 802.11 connection, for communicating with other devices, such as external processors, servers, or storage devices. Use of communication links 25 and 27 allows a secondary device, such as a body-worn device or hand-held device to process position, navigation, or timing (PNT) data or raw data transmitted over communication links 25 and 27. According to some embodiments, the secondary device may overlay user's 11 position on a map or output a display of user's 11 tracked location and path and the distances of each leg of the tracked path. Although only one of processors 17 in FIG. 2B shows external communications links 25 and 27, it is contemplated that either, neither, or both of processors 17 may include these links. Similarly, although FIG. 2B shows a connection between DMR originator 11a and processor 17, but not between DMR transponder 11b and processor 17, it is contemplated that DMR transponder 11b may be similarly connected to processor 17 to facilitate communication between DMR transponder 11b and processor 17.

Although processing units 12 are shown as part of shoe or boot 20 in FIG. 2B, it is contemplated that according to some embodiments, processing units 12 may be located external to shoe or boots 20, for example, in user's 11 pants, backpack, or handheld device. It is also contemplated that the components shown in FIG. 2B are exemplary and other components may be added. Similarly, the distribution of components between processing unit 12 and sensor unit 14 in FIG. 2B are exemplary and may be redistributed according to some embodiments. For example, GPS receivers 15 and/or processors 7 may be located within sensor units 14. Memory 19 may also be located in sensor units 14 according to some embodiments.

Processors 17, and in some embodiments DMR originator 11a and DMR transponder 18b, may be any device capable of receiving and processing data, for example, FPGAs, ASICs, microprocessors, system on chip (SoC) devices, or other processors known in the art. Memory 19 may be either internal or external to processor 17 and may be any form of storage device, such as microSD cards, USB tokens or keys, flash drives, flash memory, DDR, SDRAM, DRAM, or other solid state memory devices. Although solid state memory devices are advantageous, it is contemplated that memory 19 may be in other storage media, such as optical or magnetic storage media.

Position Tracking Using IMU Data

Generally, an inertial navigation system relies on data packets from IMUs 13 containing real-time information about the estimated position, velocity, and attitude of user 11, which are corrected using a filter, such as a Kalman filter. Some methods for processing IMU data are described in U.S. Pat. No. 8,224,575 (which is assigned to the same assignee as the present patent application), the disclosure of which is hereby incorporated by reference in its entirety. System 10 also, for example processing unit 12, collects data packets from IMUs 13 of each shoe or boot 20 and uses the IMU data packets to provide an initial estimate of the position, velocity, and attitude of user 11.

For example, processing unit 12 may process the data received from IMUs 13 in sensor units 14, solve navigation equations, and implement a filter, such as a Kalman filter, to estimate the position, velocity, and attitude of one or both IMUs 13. After each of these estimates is calculated, the raw and/or processed data may be stored in memory 19 and/or transmitted via communications links 25 or 27. According to some embodiments, raw data may be stored in memory 19 before processing, as described below, and processed data may also be stored in memory 19 or transmitted via one or more of communications links 25 or 27. The results of the processing performed in processing unit 12 provides new "current" estimate of position, velocity, and/or attitude, while all estimates remaining in memory are known as "previous" estimates. Current and previous estimates of the user's 11 position, velocity, and attitude are based on the IMU data packets and initial position estimates and may be corrected in one or more ways, as discussed in greater detail below.

IMU Orientation and Damping

Figure 3A:
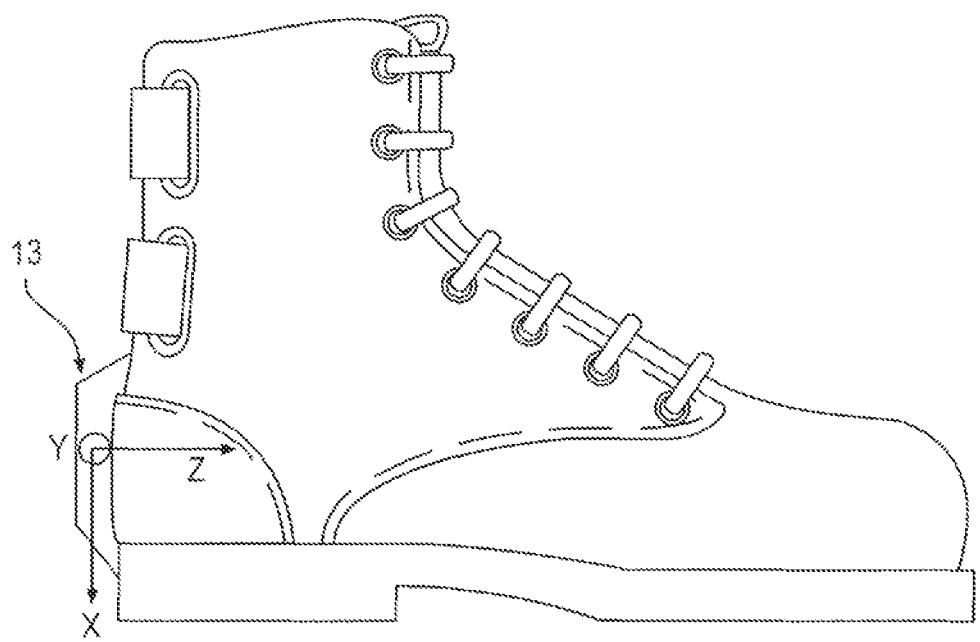
FIG. 3A is diagram of a first exemplary inertial measurement unit coordinate system of the pedestrian tracking system of FIG. 1.
Figure 3B:
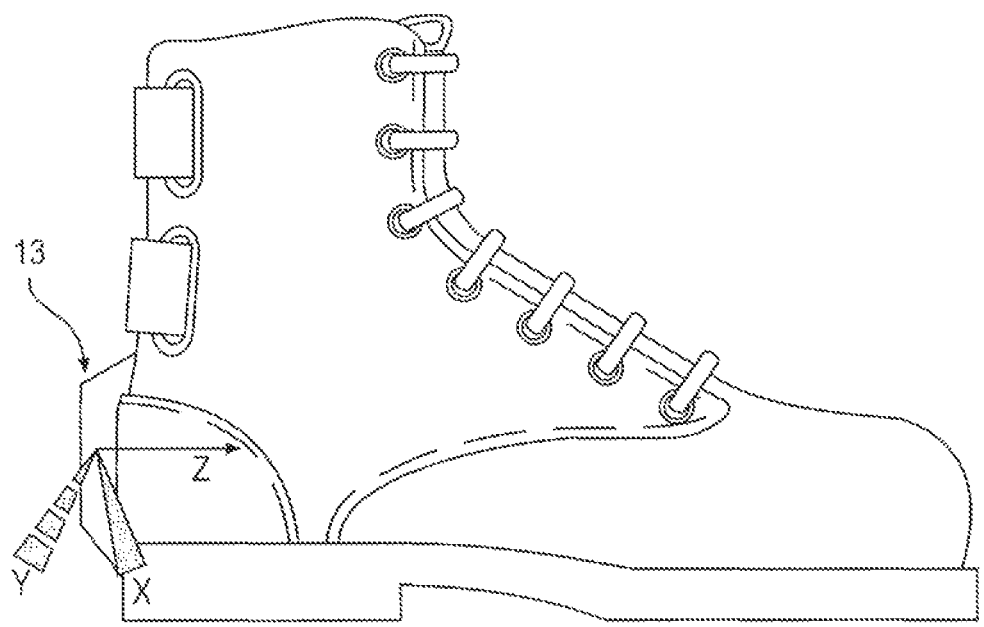
FIG. 3B is diagram of a second exemplary inertial measurement unit coordinate system of the pedestrian tracking system of FIG. 1.

FIGS. 3A and 3B show two exemplary configurations for the axes X, Y, and Z of an exemplary IMU 13. Axes X, Y, and Z represent the three orthogonal accelerometer axes of IMU 13. In FIG. 3A, the X axis is directed downward (i.e., perpendicular to the ground) when the user 11 is standing with his foot flat on the ground. The Z axis is directed forward (i.e., parallel to the ground) in relation to the user, and is orthogonal to the X axis. The Y axis is directed into of the plane of FIG. 3A (i.e., parallel to the ground), and is orthogonal to the X axis and Z axis. The X, Y, and Z axes may follow a conventional right-handed coordinate system.

FIG. 3B shows a second exemplary coordinate system for IMU 13. In contrast to FIG. 3A, the X and Y axes of FIG. 38 are rotated about the Z axis by 45 degrees, such that each of the X and Y axes are directed into the ground at an angle of 45 degrees when the user is standing flat-footed. In the embodiment shown in FIG. 3B, the X axis is angled out of the plane of FIG. 3B, while the Y axis is angled into the plane of FIG. 38. The Z axis remains directed forward (i.e., parallel to the ground). In FIG. 3B, both the X and Y axes register the downward motion of IMU 13, which increases the dynamic range of IMU 13.

The three-axis coordinate system of IMU 13 may be referred to as the "body frame" herein.

Figure 4A:
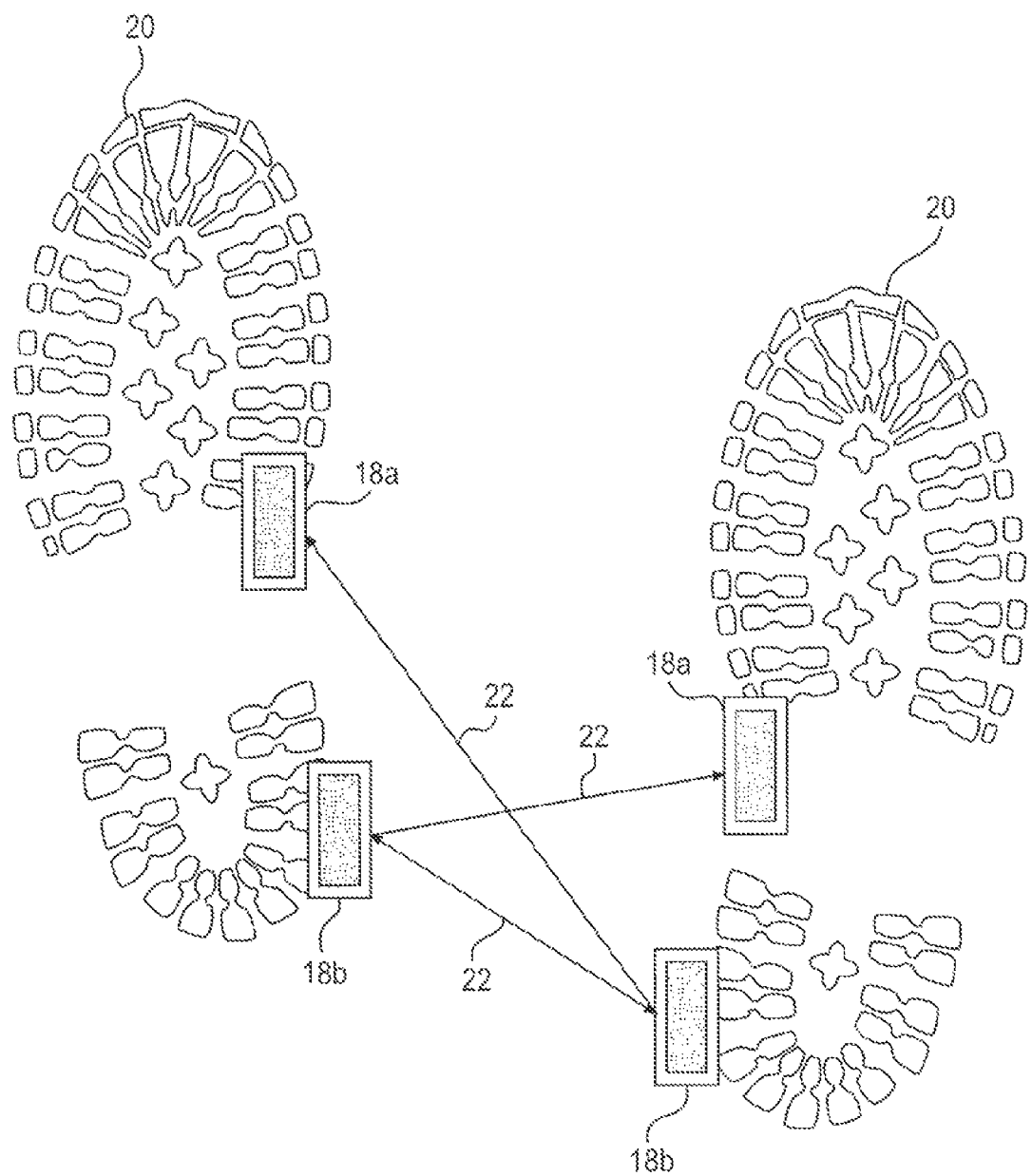
FIG. 4A is a schematic of an exemplary system including RF measurements between multiple antennas.

According to some embodiments, sensor unit 14 may include a damping material around IMU 13 to mitigate the effects of extreme accelerations Range Measurements Between Multiple Antennas As shown in FIG. 4A, according to some embodiments, DMR antennas 18a and 18b provide three measurements between each of the DMR antennas 18a and 18b of each foot. Each of these measurements is performed as a range measurement 22. As shown in FIG. 4A, a first range measurement 22 is provided between DMR antennas 18b located near the heel of each shoe or boot 20. A second range measurement 22 is provided between DMR antenna 18b near the heel of the left boot 20 and DMR antenna 18a near the midsole or toe of the right shoe or boot 20. A third range measurement 22 is provided between DMR antenna 18b near the heel of the right boot 20 and DMR antenna 18a near the midsole or toe of the left boot 20. It is also contemplated that a fourth DMR measurement could be made between DMR antennas 18a near the midsole or toe of each boot 20.

Range measurements 22 shown in FIG. 4A may be performed using either a full-duplex round-trip time-of-flight measurement or a half-duplex round-trip time-of-flight measurement.

According to some embodiments, in a half-duplex round-trip time-of-flight measurement, DMR antenna 18b of left boot 20 transmits a wireless signal, including a data packet, which is received by each of DMR antennas 18a and 18b of right boot 20. The signal is processed in processing unit 12 and/or sensor unit 14 of right boot 20 (see FIGS. 1 and 2B) based on the wireless signals received at each of DMR antennas 18a and 18b of right boot 20. Sensor unit 14 and/or processing unit 12 may, for example, update the data packet to incorporate data relating to the propagation time (for example, timestamps) of the wireless signal between DMR antenna 18b of the originator (i.e., left boot 20) and DMR antennas 18a and 18b, respectively, of the transponder (i.e., right boot 20). Sensor unit 14 and/or processing unit 12 may also include data relating to any system delays from data processing in right boot 20. DMR antenna 18b of right boot 20 then transmits the updated data packet via a wireless transmission to DMR antennas 18a and 18b of left boot 20. Based on the wireless transmission received at DMR antennas 18a and 18b of left boot 20 and the system delays, three round-trip propagation times can be calculated corresponding to each range measurement 22 shown in FIG. 4A. Specifically, there may be a round-trip propagation time between DMR antennas 18b near the heel of each boot 20; a round-trip propagation time between DMR antenna 18b near the heel of left boot 20 and DMR antenna 18a near the midsole or forefoot of right boot 20, then from the DMR antenna 18b near the heel of the right booth 20 to DMR antenna 18b near the heel of the left boot 20; and a round-trip propagation time between DMR antenna 18b near the heel of right boot 20 and DMR antenna 18a near the midsole or forefoot of left boot 20, then from the DMR antenna 18b near the heel of the right booth 20 to DMR antenna 18b near the heel of the left boot 20. Other round-trip propagations based on combinations of DMR antennas 18 are also contemplated. Using the round-trip propagation time between DMR antennas 18b near the heels of each boot 20, the unidirectional heel-to-midsole propagation times can be calculated between the DMR antennas 18b near the heels of boots 20 and DMR antennas 18a near the midsole or forefoot of boots 20.

The unidirectional heel-to-midsole propagation times can be calculated based on the round-trip time-of-flight from the heel-to-forefoot time and the heel-to-heel round trip time of fight. Knowing the total time-of-flight for the heel-to-toe round-trip measurements and subtracting out the time of flight for one direction of the heel-to-heel measurement yields the unidirectional heel-to-toe time of flight.

A heel-to-heel (i.e., DMR antenna 18b to DMR antenna 18b) round-trip propagation time can be calculated, for example, as disclosed in U.S. Pat. No. 8,199,047, the entire disclosure of which is herein incorporated by reference. The distance between DMR antennas 18b can therefore be calculated. Knowing the distance between DMR antennas 18b and the unidirectional heel-to-toe time-of-flight, the distance between from DMR antenna 18b to DMR antenna 18a can be calculated. By knowing the unidirectional propagation time between each of the DMR antennas 18a and 18b, the distance can be calculated by methods known in the art, such as multiplying by the speed of light and dividing by two for a round-trip propagation, or multiplying by the speed of light for a unidirectional propagation.

According to some embodiments, each range measurement 22 in FIG. 4A may be calculated by performing a separate round-trip time-of-flight measurement between each of DMR antennas 18a and 18b of each boot 20. It is contemplated that these separate measurements may be simultaneous or sequential, and each measurement may occur on the same or different radio frequencies. One example of sequential measurements is to perform a round-trip time-of-flight measurement between DMR antennas 18b near the heels of boots 20; then to perform a round-trip time-of-flight measurement between DMR antenna 18b near the heel of the left boot 20 and DMR antenna 18a near the midsole or forefoot of the right boot 20; then to perform a round-trip time-of-flight measurement between DMR antenna 18b near the heel of the right boot 20 and DMR antenna 18a near the midsole or forefoot of the left boot 20. A round-trip time-of-flight measurement between DMR antennas 18a near the midsoles or forefeet of boots 20 is also contemplated, according to some embodiments. It is contemplated that sequential measurements may be performed using a full-duplex round-trip time-of-flight measurement, according to some embodiments.

Each range measurement 22 can be included as an input to update a Kalman filter as described in greater detail below.

Although the range measurements 22 are discussed using an RF signal, it is contemplated that other methods could be used. For example, the RF signal could be an ultra-wideband transmission, or the measurement could be performed using other methods, for example, ultrasonic or other non-electromagnetic transmissions.

It is contemplated that more than two DMR antennas 18 may be positioned on each sensor unit 14, and that range measurements may be calculated between any one or more of DMR antennas 18 on a originator sensor unit 14 and any one or more of DMR antennas 18 on a transponder sensor unit 14.

Range Measurements and Carrier Phase Difference Measurements

Figure 4B:
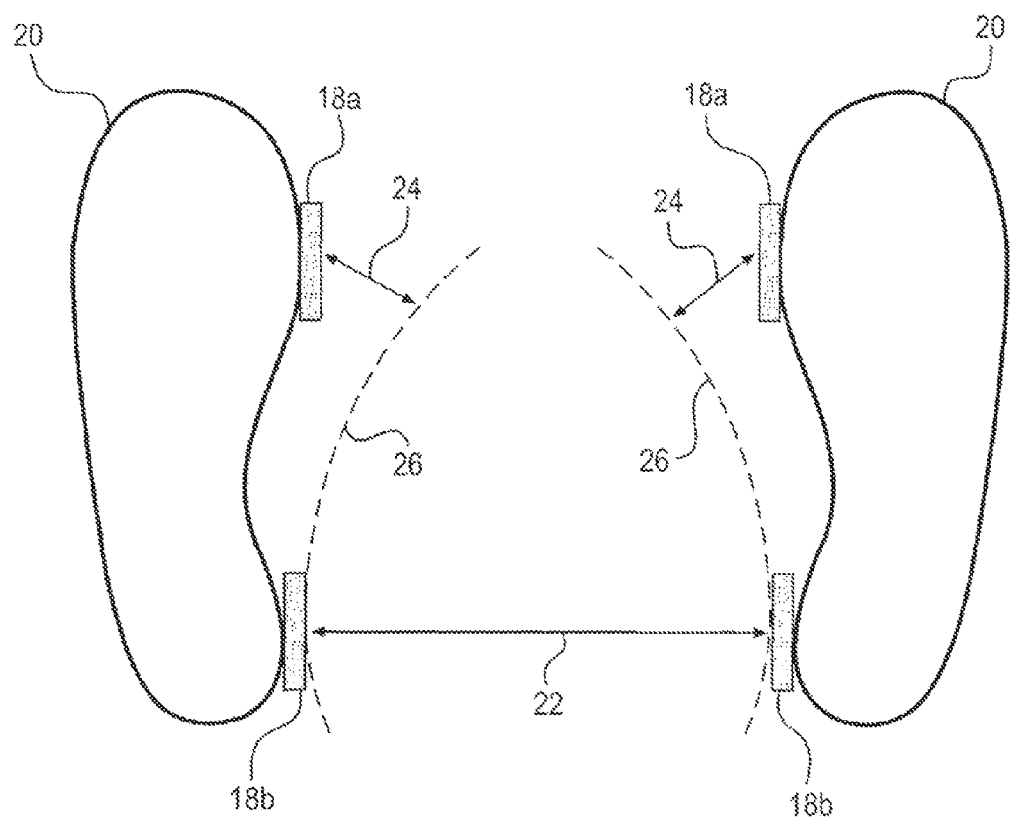
FIG. 4B is a schematic of an exemplary system including a range measurement and carrier phase difference measurements.

As shown in FIG. 4B, according to some embodiments, DMR antennas 18a and 18b may provide three measurements, a range measurement 22 between DMR antennas 18b and two carrier phase difference (CPD) measurements 24. CPD measurements 24 are time-difference-of-arrival (TDOA) measurements, such as the difference in time (which may be converted to a distance difference) that it takes a signal to propagate from DMR antenna 18b of one sensor unit 14 (e.g., the left foot) to DMR antenna 18a of the other sensor unit 14 (e.g., the right foot) as compared with range measurement 22. According to the embodiment shown in FIG. 4B, range measurement 22 may be a heel-to-heel distance between DMR antennas 18b and CPD measurement 24 may be calculated from a heel-to-toe measurement. It is also contemplated that range measurement 22 may be a toe-to-toe measurement between DMR antennas 18a instead of a heel-to-heel measurement. A circumference 26 is shown for clarity and represents a circle with a radius equal to the distance of range measurement 22, which may be used in calculating CPD measurement 24.

As shown in FIG. 4B, range measurement 22 is the heel-to-heel distance between the DMR antennas 18b of each foot. Although range measurement 22 is shown between DMR antennas 18b, it is contemplated that the measurement may be between DMR antennas 18a instead. According to some embodiments, range measurement 22 is computed using a half-duplex round-trip time-of-flight measurement, such as the method disclosed in U.S. Pat. No. 8,199,047, the disclosure of which is incorporated by reference in its entirety. Other methods of computing range measurement 22 are also contemplated, for example, ultra-wideband transmissions or ultrasonic transmissions.

As explained above and depicted in FIG. 4B, CPD measurement 24 is measured as a TDOA measurement, which is the difference in time a signal takes to propagate from the heel of one boot (e.g., the left foot) to the forefoot of the other boot (e.g., the right foot) and the time it takes to propagate between the heels of both boots (i.e., range measurement 22). Time of propagation for the half-duplex round-trip measurement can be converted to a distance by methods known in the art. In equation form, CPD measurement 24 can be written as:

$$\text{CPD} = d_{heel\text{-}to\text{-}toe} - d_{heel\text{-}to\text{-}heel}$$

where CPD is the carrier phase difference, $d_{heel\text{-}to\text{-}toe}$ is the distance between DMR antenna 18b of one sensor unit 14 (e.g., the left foot) to DMR antenna 18a of the other sensor unit 14 (e.g., the right foot), and $d_{heel\text{-}to\text{-}heel}$ is the distance equivalent to range measurement 22.

During normal walking, for example, a moving foot swings past a stationary foot. In some examples, the moving foot may swing through a relative angle of over 150 degrees as the moving foot swings in front of the planted foot. Because multiple measurements are taken during a walking motion, such as a step, CPD measurements spanning this range of motion may significantly constrain error growth in the navigation directions, such as the cross-track direction.

To calculate CPD measurement 24, an originator antenna, for example, antenna 18a of the left foot of FIG. 4B, transmits waveform, s(t), which is a combination of a carrier waveform, c(t), and a second waveform, g(t), such that $$s(t) = g(t) \cdot c(t)$$

where c(t) is the transmitted waveform $$c(t) = \cos(2\pi f_T t + \theta(t))$$

and where $f_T$ represents the transmitted RF carrier frequency and $\theta(t)$ represents the phase of the carrier waveform at a time t. The waveform s(t) is received by the two transponder antennas, for example, antennas 18a and 18b of the right foot of FIG. 4B. Combining these two equations:

$$s(t) = g(t) \cdot \cos(2\pi f_T t + \theta(t))$$

Over short periods of time $\theta(t) = \theta(t_0) = \theta$ and can be considered constant. This constant $\theta$ is the "launch phase" of the transmitted carrier waveform at time $t_0$.

In the description below, transponder DMR antenna 18a receiving the heel-to-toe signal is denoted by the subscript 1, while transponder DMR antenna 18b receiving the heel-to-heel signal is denoted by the subscript 2. Ignoring signal noise, each receiving antenna receives a signal waveform as shown below:

$$s_1(t) = A_1 \cdot \cos(2\pi f_T t + \theta_1 + \phi(t))$$

$$s_2(t) = A_2 \cdot \cos(2\pi f_T t + \theta_2 + \phi(t))$$

where $A_1$ and $A_2$ represent the received signal amplitudes at the two receiving DMR antennas 18a and 18b, $\theta_1$ and $\theta_2$ represent the instantaneous carrier phase of the RF signal received at the two receiving DMR antennas 18a and 18b, and $\phi(t)$ represents the direct-sequence spread spectrum baseband data. The amplitudes, $A_1$ and $A_2$, incorporate various gains and losses for the antennas, propagation, and circuits in the system. According to some embodiments, signals $s_1$ and $s_2$ are modulated, for example using binary phase-shift keying (BPSK). Other modulation types are also contemplated.

The RF signal received at each receiving antenna is separated into respective in-phase and quadrature channels, i(t) and q(t), respectively, by multiplying by sine and cosine of a local oscillator frequency, $f_R$, and receiver phase, $\theta_R$. Specifically, $$i(t) = s(t) \cdot v_i(t)$$

$$q(t) = s(t) \cdot v_q(t)$$

where $$v_i(t) = \cos(2\pi f_R t + \theta_R)$$

$$v_q(t) = \sin(2\pi f_R t + \theta_R)$$

The received RF signal is down-converted to baseband by mixing the received signal with the in-phase, $v_i(t)$, and quadrature, $v_q(t)$, local oscillator waveforms. The baseband in-phase and quadrature baseband waveforms, i(t) and q(t), respectively, for the first transponder antenna (e.g., DMR antenna 18a of the right foot) is described by the equations below $$i_1(t) = s_1 \cdot v_i(t)$$
$$= A_1 \cos(2\pi f_T t + \theta_1 + \varphi(t)) \cdot \cos(2\pi f_R t + \theta_R)$$
$$\approx A_1 \cos(\Delta\omega t + \theta_1 - \theta_R + \varphi(t))$$

$$q_1(t) = s_1 \cdot v_q(t)$$
$$= A_1 \cos(2\pi f_T t + \theta_1 + \varphi(t)) \cdot \sin(2\pi f_R t + \theta_R)$$
$$\approx A_1 \sin(\Delta\omega t + \theta_1 - \theta_R + \varphi(t))$$

Similarly, at the second receiving antenna (e.g., DMR antenna 18b of the right foot):

$$i_2(t) \approx A_2 \cos(\Delta\omega t + \theta_2 - \theta_R + \varphi(t))$$

$$q_2(t) \approx A_2 \sin(\Delta\omega t + \theta_2 - \theta_R + \varphi(t))$$

The relationship between the in-phase and quadrature waveforms for the first receiving antenna at any time sample t' can be described as the ratio of the quadrature waveform, $q_1(t')$, over the in-phase waveform, $i_1(t')$:

$$\frac{q_1(t')}{i_1(t')} = \frac{A_1 \sin(\Delta\omega t' + \theta_1 - \theta_R + \varphi(t'))}{A_1 \cos(\Delta\omega t' + \theta_1 - \theta_R + \varphi(t'))}$$
$$= \tan(\Delta\omega t' + \theta_1 - \theta_R + \varphi(t'))$$

Similarly, the relationship between the in-phase and quadrature waveforms for the second receiving antenna at any time sample t' can be described as the ratio of the quadrature waveform, $q_2(t')$, over the in-phase waveform, $i_2(t')$:

$$\frac{q_2(t')}{i_2(t')} = \frac{A_2 \sin(\Delta\omega t' + \theta_2 - \theta_R + \varphi(t'))}{A_2 \cos(\Delta\omega t' + \theta_2 - \theta_R + \varphi(t'))}$$
$$= \tan(\Delta\omega t' + \theta_2 - \theta_R + \varphi(t'))$$

At any time t', the frequency offset $\Delta\omega t'$, the instantaneous baseband phase $\phi(t')$, and the phase of the local oscillator $\theta_R$ are the same for both the first and second receiving antennas. In other words, $\theta_R$ is constant, and at any time t', $\Delta\omega t'$ and $\phi(t')$ assume some value, these terms can be combined into a single constant, $\alpha$.

Therefore, replacing $\Delta\omega t'$, $\phi(t')$, and $\theta_R$ with the constant, $\alpha$, the equations for both $$\frac{q_1(t')}{i_1(t')}$$

and $$\frac{q_2(t')}{i_2(t')}$$

can be rewritten as $$\frac{q_1(t')}{i_1(t')} = \tan(\alpha + \theta_1)$$

$$\frac{q_2(t')}{i_2(t')} = \tan(\alpha + \theta_2)$$

Taking the arctangent of both sides of these equations, and subtracting the second receiving antenna from the first receiving antenna yields:

$$\arctan\left(\frac{q_1(t')}{i_2(t')}\right) - \arctan\left(\frac{q_2(t')}{i_2(t')}\right) = (\alpha + \theta_1) - (\alpha + \theta_2)$$

which can be rearranged to form:

$$\theta_1 - \theta_2 \big|_{t'} = \arctan\left(\frac{q_1(t')}{i_1(t')}\right) - \arctan\left(\frac{q_2(t')}{i_2(t')}\right)$$

or:

$$\theta_1 - \theta_2 \big|_{t'} = \theta_{heel-to-toe} - \theta_{heel-to-heel} \big|_{t'}$$
$$= CPD$$

where $\theta_1 - \theta_2 \big|_{t'}$ is the carrier phase difference (CPD) between the first and second receive antennas at the time t'. This phase difference can then be converted into a distance measurement by methods known in the art, for example, by dividing the phase change (in radians) by $2\pi$ and multiplying by the wavelength of the carrier. Therefore, CPD measurement 24 represents the phase change corresponding to the distance between the heel-to-toe distance and the heel-to-heel distance (i.e., $\theta_{heel-to-toe} - \theta_{heel-to-heel}$).

Therefore, at each baseband sample, if $$\arctan\left(\frac{q}{i}\right)$$

is computed for both transponder DMR antennas 18a and 18b and subtracted, the result will be the CPD in radians at the given time, which can be converted to a distance value. This calculation can be repeated for each baseband sample and is applicable for all samples. One advantage to this calculation is that no analog processing is needed because the down-conversion to baseband essentially integrates over the carrier wave, such that a constant phase is assumed. CPD measurement 24 can be tracked over time using a linear regression. CPD measurement 24 can also be tracked using non-linear regressions.

According to some embodiments, CPD measurements 24 may be measured using the preamble of a data packet sent from the transmitting DMR antenna 18b to the receiving DMR antenna 18a. The preamble may include many usable samples to calculate CPD measurement 24, in some cases more than 30,000 samples. This high sample availability may allow for high processing gain, such as 20 dB or greater. Similarly, CPD measurement 24 uses relatively low processing power in processing unit 12. Because CPD measurement 24 is a differential measurement, it may also attenuate interference from local error sources that correlate to both channels, i and q. Local error sources may include local oscillator (LO) frequency drifting, LO phase noise, receiver temperature calibration, receiver gain calibration, and power supply ripple. Other local error sources are also contemplated; however, because local error sources should affect both of the i and q channels of the receiver equally, error from these sources should be mitigated by the differential calculation of CPD measurement 24.

According to some embodiments, CPD measurement 24 may be computed using the baseband phase rather than the carrier phase, resulting in a baseband phase difference (BPD) measurement. A BPD measurement could be calculated by computing the baseband phase of both the first and second receiving antennas, for example, DMR antennas 18a and 18b of the same sensor unit 14. These baseband phase measurements could then be subtracted on a symbol-by-symbol basis. According to some embodiments, the received data is correlated to a PN spreading code, such as the spreading code described below, and the BPD measurement is computed from the correlated waveforms. A BPD measurement would still result in a differential calculation, thereby retaining the benefits similar to CPD measurement 24 described above, such as mitigation of local error source impact. However, a BPD measurement may also benefit from direct-sequence spread-spectrum (DSSS) robustness to interference. A BPD measurement may also mitigate carrier cycle ambiguity that may result from a direct CPD measurement. For clarity and conciseness, the term "CPD measurement" in this specification refers to both a carrier phase difference measurement and a baseband phase difference measurement. Therefore, it is understood that CPD measurement 24 may include a carrier phase difference measurement, a baseband phase difference measurement, or both, or their equivalents. It is further contemplated that the carrier phase may be computed by other methods.

According to some embodiments, the received signals, for example, $s_1$ and $s_2$, may be synchronously downconverted and digitized. The downconversion and digitization may include a conversion to in-phase and quadrature channels, for example, as described above. During the conversion process, a carrier recovery block uses the measurements received at the receiving antennas and may convert raw in-phase and quadrature data to processed in-phase and quadrature data. As part of the conversion processing, the phase of each received signal is output as part of the processed data. This phase may be equivalent to the carrier phase for each received signal at the receiving antennas. According to some embodiments, one of the carrier phases may be subtracted from the other carrier phase to determine the carrier phase difference, which may be converted to a corresponding time value or distance value, as described above. According to some embodiments, each carrier phase signal may be converted to a corresponding time value or distance value. One or more of the carrier phases, time values, or distance values may then be used to estimate a position and/or filter, as described below.

Figure 5:
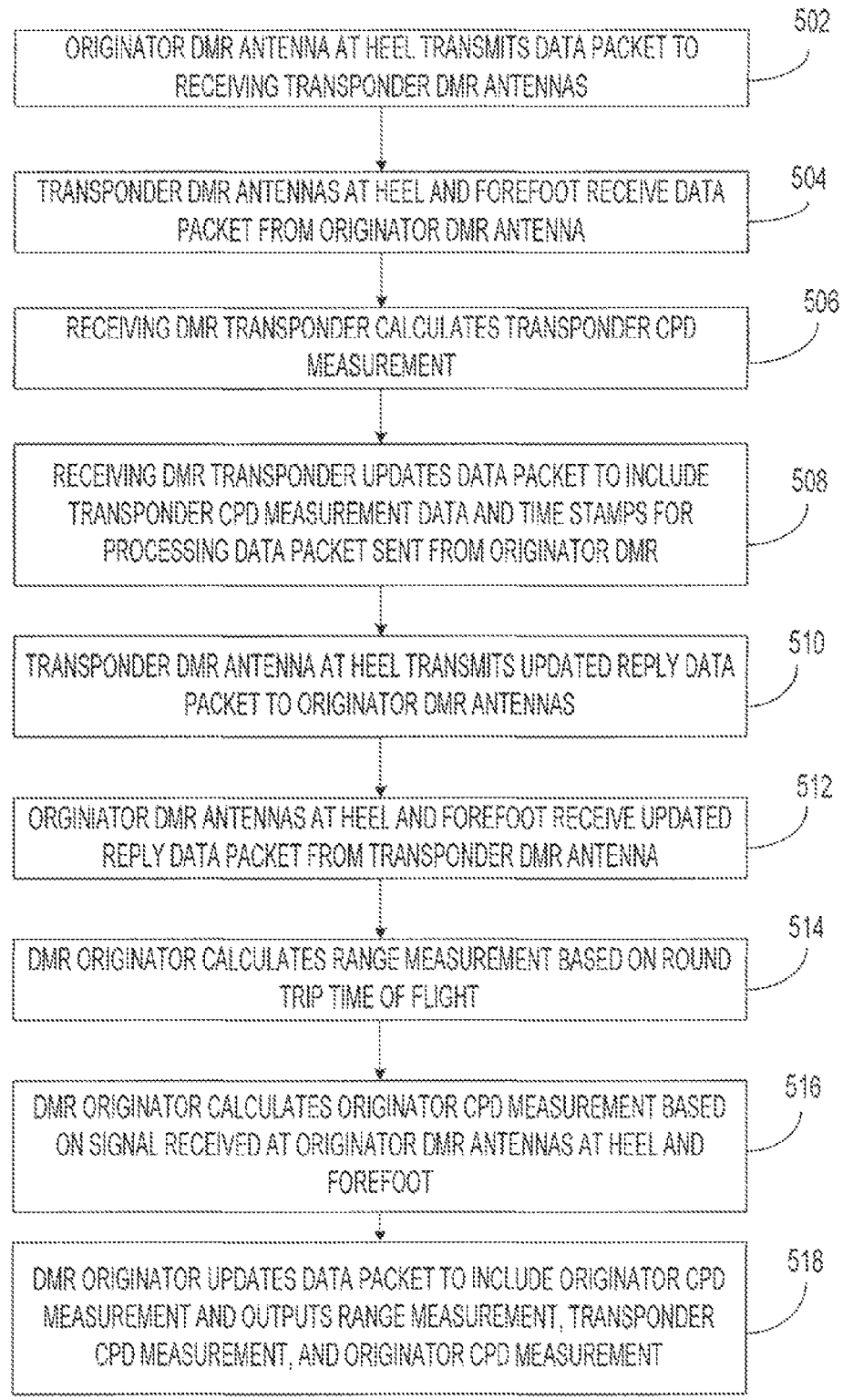
FIG. 5 is flow diagram of an exemplary method for calculating the range measurement and carrier phase differences shown in FIG. 4B.

An exemplary method for performing range measurement 22 and CPD measurements 24 is shown in FIG. 5. For simplicity, FIG. 5 references originator DMR antennas on the heel and forefoot of a primary boot and transponder DMR antennas each on the heel and forefoot of a secondary boot. The terms "originator," "transponder," "heel," "forefoot," "primary boot," and "secondary boot" are chosen to facilitate understanding of this example and are not limiting of this disclosure. For example, the terms "primary boot" and "originator" refer to the location(s) from which the first transmission in a half-duplex round-trip process is made, while "secondary boot" and "transponder" refer to the location(s) that receive the first transmission in the half-duplex round-trip process and may re-transmit an updated transmission to the primary boot/originator. Similarly, the terms "heel" and "forefoot" are merely exemplary locations for mounting DMR antennas 18a and 18b on, for example, a foot, shoe, or boot, but are not limiting of the locations where the antennas may be mounted. It is contemplated that although the transmitting antennas are described at the heel of the primary and secondary boot, they may be positioned midsole or at the forefoot according some embodiments. Similarly, the antennas described as at the forefoot of the primary and secondary boots may be positioned at the midsole or heel according to some embodiments.

At step 502, an originator DMR antenna at the heel of a primary boot, for example, DMR antenna 18b of the left foot in FIG. 4B, transmits a data packet to the receiving transponder DMR antennas of a secondary boot, for example, DMR antennas 18a and 18b of the right boot in FIG. 4B. At step 504, the transponder DMR antennas of a secondary boot, for example, DMR antennas 18a and 18b of the right boot in FIG. 4B, receive the transmitted data packet from the originator DMR antenna. The transponder DMR antennas may be located, for example, at the heel and forefoot of the secondary boot.

At step 506, the DMR transponder in the secondary boot calculates a transponder CPD measurement, for example, CPD measurement 24, as described above, which represents the distance difference between the originator-DMR-antenna-to-forefoot-transponder-DMR-antenna distance, and the originator-DMR-antenna-to-heel-transponder-DMR-antenna distance. Although FIG. 5 states that this calculation takes place in the DMR transponder, for example, DMR transponder 11b of FIG. 2B, it is contemplated that the calculation could take place in processing unit 12 of FIG. 2B, such as processor 17.

At step 508, the DMR transponder updates the received data packet sent by the originator DMR antenna to include the calculated transponder CPD measurement. The DMR transponder also updates the received data packet to include time stamp information that may be used by the DMR originator to calculate the range measurement 22 between, for example, the DMR antennas 18b at the heels of each boot, as described below. According to some embodiments, the transponder CPD may not be calculated in the secondary boot, but instead the transponder may transmit only precursor data, such as i and q data, back to the originator.

At step 510, the transponder DMR antenna at the heel of the secondary boot, for example, DMR antenna 18b of the right foot shown in FIG. 4B, transmits the updated data packet to the originator DMR antennas of the primary boot, for example, DMR antennas 18a and 18b of the left boot in FIG. 4B.

At step 512, the originator DMR antennas at the heel and forefoot of the primary boot receive the updated data packet sent by the transponder DMR antenna of the secondary boot. At step 514, the DMR originator of the primary boot, for example, DMR originator 11a of FIG. 2B, calculates the distance between the heel DMR antennas 18b at the heels of the primary and secondary boots, which represents range measurement 22. As described above, range measurement 22 may be calculated as described in U.S. Pat. No. 8,199,047, the disclosure of which is incorporated by reference herein in its entirety. Other methods for calculating range measurement 22 are also contemplated.

At step 516, the primary boot uses the received transmissions, including the updated data packet, to calculate an originator CPD measurement, such as CPD measurement 24 described above. The originator CPD measurement represents the distance difference between the heel-transponder-DMR-antenna-to-forefoot-originator DMR-antenna distance, and the heel-transponder-DMR-antenna-to-heel-originator-DMR-antenna distance.

Figure 6:
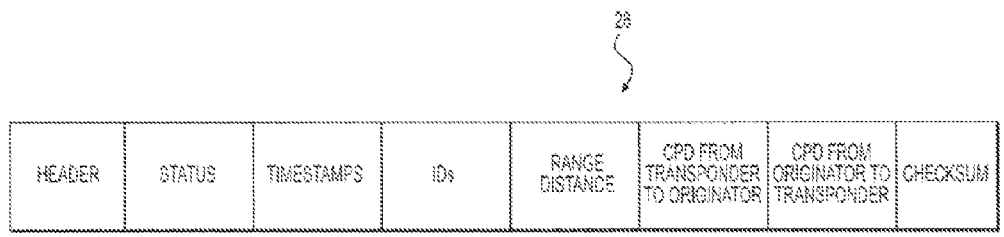
FIG. 6 is an exemplary message structure for transmitting a range measurement and carrier phase difference measurements.

At step 518, the DMR originator updates the data packet to include the originator CPD measurement and the range measurement. The DMR originator 11a sends a structured message, such as message 28 shown in FIG. 6, to processing unit 12 of the primary boot. It is, however, contemplated that the calculation of the range measurement and originator CPD measurement may occur in processing unit 12 in some embodiments.

Because exemplary CPD measurement 24 uses a half-duplex round-trip process, it is understood that the actual positions of the transponder DMR antennas 18a and 18b will change by a very small amount because the transponder foot is in motion during the measurement. However, because the entire half-duplex round-trip measurement occurs over a very short period of time, for example, one millisecond, the variation in the transponder foot should be negligible as compared to the distance calculated and the motion should not corrupt CPD measurement 24.

The method disclosed in FIG. 5 is merely exemplary and it is contemplated that some embodiments may include variations or alterations. For example, according to some embodiments, the transmitting DMR antennas may not be the heel DMR antenna 18b, but may instead be the forefoot DMR antenna 18a. According to some embodiments, the DMR transponder 11b and/or DMR originator 11a may not calculate the CPD measurements 24 or range measurement 22 directly, but may instead calculate precursors of these values, such as i and q data, which are used by processing unit 12 to calculate these CPD measurements 24. According to some embodiments, the secondary boot may transmit the transponder CPD measurement to the primary boot through connection 23 of FIG. 2B, rather than as part of the reply data packet.

As explained above, each DMR measurement (e.g., range measurement 22 or CPD measurement 24) may be computed by measuring a round-trip time-of-flight distance between the DMR antennas 18. The round-trip time-of-flight calculation may be, for example, a half-duplex communication in which the originator/primary boot's DMR antenna 18b sends a data packet, or other signal, to the transponder/secondary boot, which calculates a first CPD measurement 24 (e.g., left-to-right) between the boots. The transponder/secondary boot then retransmits a data packet, which has been updated to include CPD measurement 24 and time stamps, back to the originator/primary boot. When the originating boot receives the retransmitted data packet, it calculates a second CPD measurement 24 (e.g., right-to-left) between the transponder/secondary boot and the originator/primary boot. Range measurement 22 and CPD measurements 24 are then used to estimate the position of the transponder/secondary boot, thereby estimating a new position of the pedestrian.

An exemplary DMR data packet includes a preamble, a synchronization word, and a data payload. It is contemplated that the DMR data packet may have other components in its structure. According to some embodiments, the preamble and synchronization word may be included in a header of the DMR data packet. After range measurement 22 and CPD measurement 24 are calculated, DMR originator 11a sends a structured message, such as the message 28 shown in FIG. 6, to a processor for updating a Kalman filter used to estimate the position of a pedestrian. For example, message 28 may include a header, status, timestamps, IDs, range measurement 22, two CPD measurements 24, and a checksum. Range measurement 22 may be calculated as described in U.S. Pat. No. 8,199,047, the entire contents of which are incorporated herein by reference. Other methods for calculating range measurement 22 are also contemplated. CPD measurements 24 may be calculated as described above.

Filter Updates Based on Range Measurements and CPD Measurements Range Measurement-Based Updates According to some embodiments, DMR measurements (e.g., range measurement 22 and/or CPD measurements 24) may be used to update a filter, for example a Kalman filter. DMR measurement updates may further help constrain the cross-track and along-track position errors that may be introduced by the IMU and inertial navigation equations. These updates may be in addition to, or in place of, other measurement corrections. The updates described below are exemplary update processes to help constrain navigation errors. It is understood that other Kalman filter update processes may also be used, such as the processes disclosed in U.S. Pat. No. 8,224,575, the disclosure of which is hereby incorporated by reference in its entirety.

To perform a DMR measurement Kalman filter update, the navigation system, for example processing unit 12, first checks to determine whether either foot is stationary based by referencing a zero-velocity check in the IMU 13 of at least one of the shoes or boots 20. If both shoes or boots 20 are stationary, then a DMR measurement update will not be performed. However, if either of the left-foot IMU or the right-foot IMU is not stationary, a DMR measurement update may be performed. The DMR measurement update may include one or both of a range-measurement update or a CPD-measurement update, described below.

Generally, the updates to the Kalman filter use an estimate of a unit vector between two endpoints to determine position. When the position errors of two objects are small relative to the distance between them, such as in GPS-based updates, correcting the position along the unit vector may be sufficient to correct position errors, and using an extended Kalman filter (EKF) may be sufficiently accurate. However, when position errors are relatively large compared to the distance between the two endpoints, such as in pedestrian tracking systems, small position errors may create large unit vector errors A large unit vector error makes a DMR measurement-based updates along a single unit vector unstable; thus, it may be preferable to perform a DMR measurement-based updates using an unscented Kalman filter (UKF). Although a UKF-based update is described below, other filtering types are also contemplated, such as particle filters. According to some preferred embodiments, a UKF update is used for both a range-measurement update and a CPD-measurement update to the Kalman filter.

Figure 7:
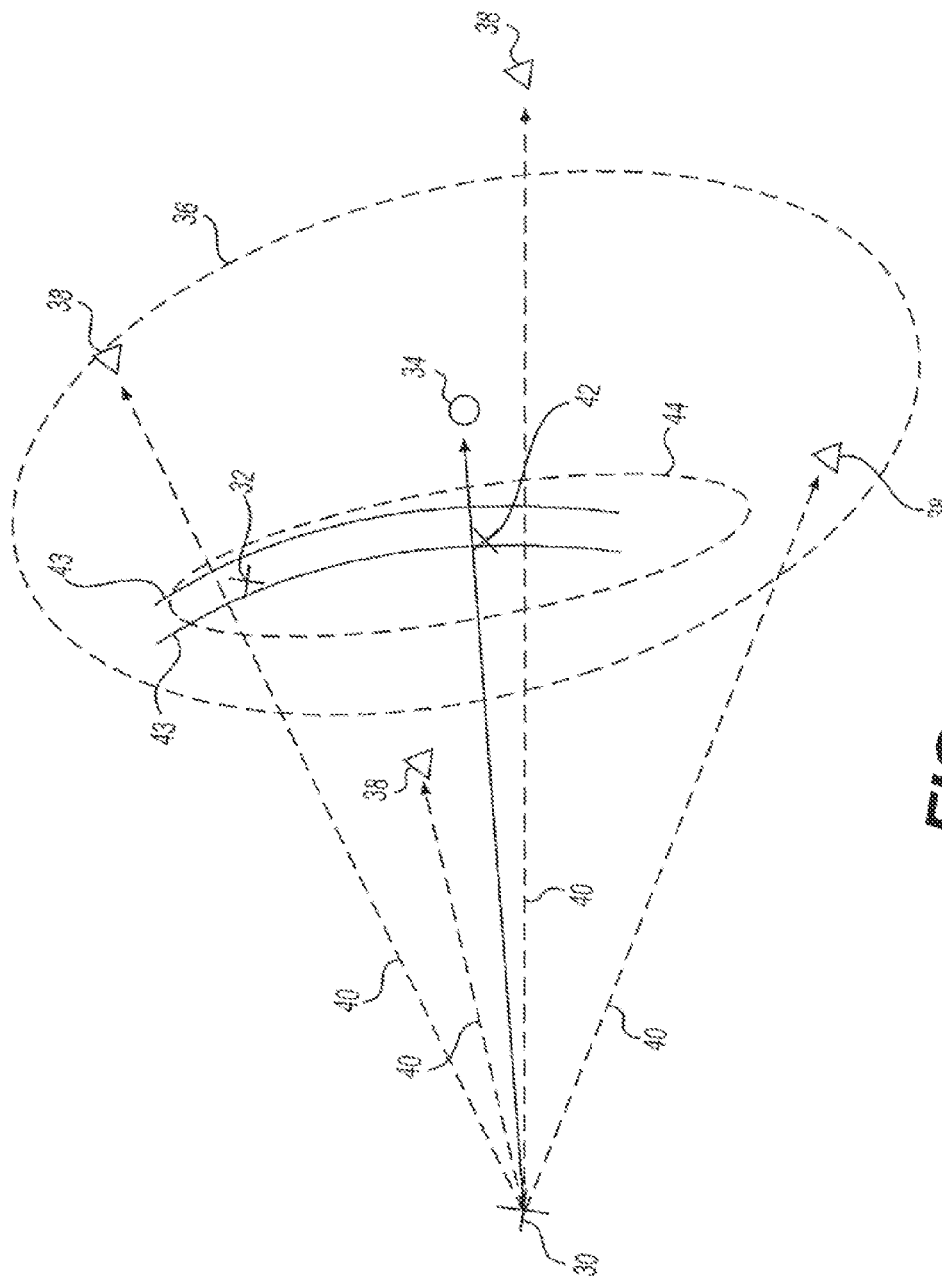
FIG. 7 is an exemplary update process for a Kalman filter using a range measurement.

FIG. 7 shows an exemplary range-measurement update process. As described above, a range measurement (e.g., range measurement 22) is made between two positions 30 and 32, for example, the true heel position of a left boot 30 and the true heel position of a right boot 32. Positions 30 and 32 may correspond to the positions of DMR antennas 18b of FIG. 4B. For purposes of this example, the left boot position is assumed to be the stationary boot (i.e., originator/primary boot), and the right boot is assumed to be the moving boot (i.e., transponder/secondary boot). For simplicity, the outlines of the right and left foot are omitted from FIG. 7. It is understood, however, that the right boot could be the stationary boot and the left boot could be the moving boot, and a similar calculation could be applied.

A current estimate of the right heel position 34, e.g., the moving boot, has an estimated pre-update position error 36. Corrections to the estimated right heel position 34 are calculated based on the difference between the predicted and actual measurements and the state covariance matrix. A UKF filter update may be applied to estimated right heel position 34 using a set of sigma points 38. The use of sigma points to update as part of a UKF update is known in the art. A state covariance matrix may be pruned along the unit vectors 40 between left heel position 30 and sigma points 38. The result of this process is the new right-foot estimated position 42, with an estimated position error 44, which encompasses the true position of the right foot 32. According to some embodiments, the new estimated right heel position 42 may be constrained to lie within the allotted range error bounds 43 of the filter. According to some embodiments, the state covariance matrix may be pruned along unit vectors between an estimated heel position (not shown) and sigma points 38.

The predicted heel-to-heel range measurement 47, $\hat{r}_i$, for the $i^{th}$ sigma point 38 for the set of N total sigma points is described by $$\hat{r}_i = \|(\hat{p}_{right} + \chi_{i,right}) - (\hat{p}_{left} + \chi_{i,left})\|$$

where $\hat{p}_{right}$ and $\hat{p}_{left}$ represent the estimated positions of the right boot 42 and left boot 41, respectively (see FIG. 8); and $\chi_{i,right}$ and $\chi_{i,left}$ represent the $i^{th}$ set of sigma point position offsets from the mean for the right and left boot, respectively. For clarity, true left heel position 30 corresponds to the actual position of DMR antenna 18b of the originator boot and true right heel position 32 corresponds to the actual position of DMR antenna 18b of the right boot. Thus, predicted heel-to-heel range measurement 47, $\hat{r}_i$, represents an estimation of the range measurement 22. The predicted heel-to-heel range measurement 47, $\hat{r}_i$, may be measured either between left heel position 30 and estimated right heel position 42, or between an estimated left heel position (not shown) and estimated right heel position 42. The exemplary UKF-based range-measurement update provides a more accurate estimate of range measurement errors when the feet are close together, thus allowing for better filter convergence and robustness.

Although only four sigma points 38 are shown in FIG. 7, it is contemplated that any number of sigma points could be used, depending on the parameters of the system, such as processing power, sample rate, etc. Although FIG. 7 is described with respect to heel positions, it is contemplated that an update could be performed between any positions, for example, any two DMR antennas, in system 10.

CPD Measurement-Based Updates

A CPD-measurement update can also be employed in addition to, or in place of, a range-measurement update during the Kalman filter update process.

Figure 8:
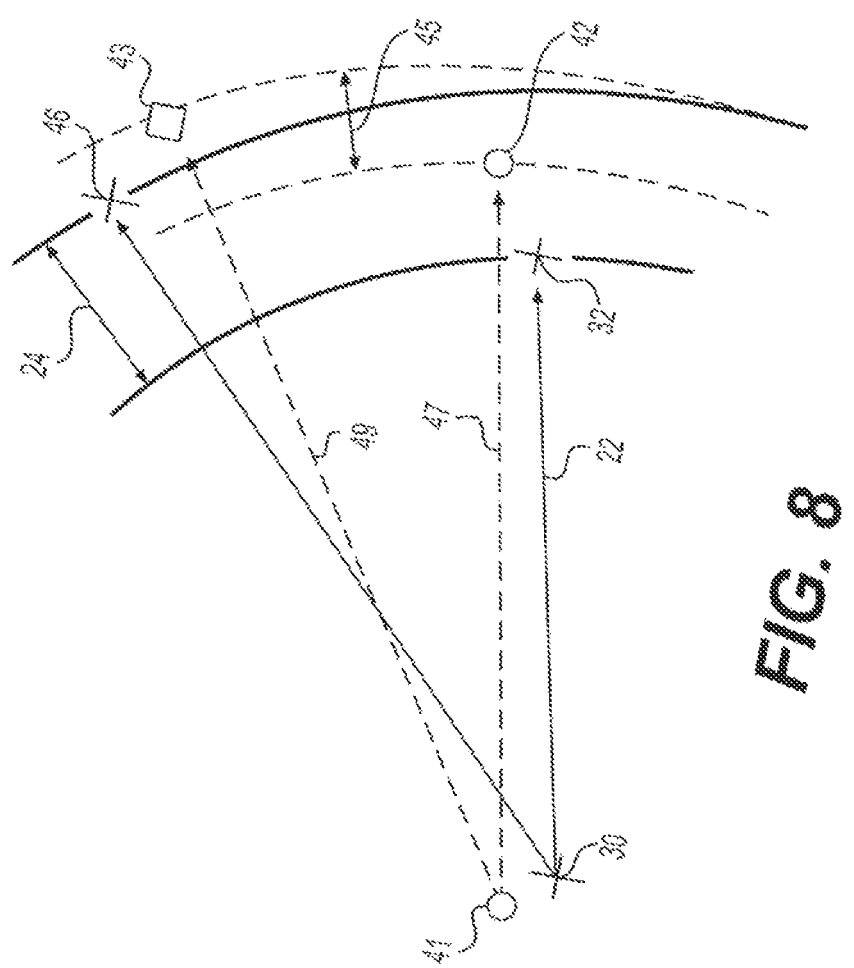
FIG. 8 is an exemplary update process for a Kalman filter using a carrier phase difference measurement.

FIG. 8 shows an exemplary CPD-measurement update process for a Kalman filter. For clarity, as used in FIG. 8, true left heel position 30 corresponds to the actual position of DMR antenna 18b of the originator boot and true right heel position 32 corresponds to the actual position of DMR antenna 18b of the right boot, and true right forefoot position 46 corresponds to the actual position of DMR antenna 18a of the right boot.

The exemplary CPO-measurement update process of FIG. 8 is a UKF-based update. For simplicity, the sigma points have been omitted from FIG. 8, although it is contemplated that sigma points are used as part of a UKF-based update. It is also contemplated additional sets of sigma points can be used to update each of the estimated positions, for example the estimated position of the left heel 41, $\hat{p}_{left}$; the estimated position of the right heel 42, $\hat{p}_{right}$; and the estimated position of the right forefoot 43, $\hat{p}_{right\_forefoot}$. The CPD-measurement update constrains pitch and heading errors for CPD measurement 24. The CPD-measurement update also constrains the position errors of both feet.

As explained previously, a CPD-measurement update may occur when at least one of the two feet is not stationary. For simplicity, the outlines of the feet in FIG. 8 have been omitted. Assuming that forefoot DMR antenna 18a is roughly fixed in the body-frame of the IMU and the position offset is known through calibration, the location of the forefoot antenna can be roughly computed based on the location of the heel DMR antenna, for example DMR antenna 18b of the same foot. Using the attitude of IMU 13 of the moving foot (i.e., the right foot in FIG. 8), the position of the right forefoot for the $i^{th}$ signal point set can be estimated using the following equations $$\Delta p_{i,right\_heel\_to\_forefoot} \approx [\hat{C}_{right}(I + [\chi_{i,right\_att}]_x)]^T p_{fixed\_right}$$

$$\hat{p}_{i,right\_forefoot} = \hat{p}_{right} + \chi_{i,right\_pos} + \Delta p_{i,right\_heel\_to\_forefoot}$$

where $\Delta p_{right\_heel\_to\_forefoot}$ is the heel-to-forefoot antenna position offset vector of the right boot in the geographic body frame; $\hat{C}_{right}$ is the current IMU estimate of the direction-cosine-matrix that transforms the geographic position to the body frame; I is a 3-by-3 identity matrix; $\chi_{i,right\_att}$ is the $i^{th}$ set of attitude offset sigma points from the mean for the right foot; $\chi_{i,right\_att}$ is the $i^{th}$ set of position offset sigma points from the right foot; $p_{fixed\_right}$ is the body-frame heel-to-forefoot antenna position offset for the right foot; $\hat{p}_{right\_forefoot}$ is the estimated position of the right forefoot antenna 43; and $\hat{p}_{right}$ is the estimated heel position of the right foot 42. The superscript, T, indicates that the preceding matrix is transposed, and $[\chi_{i,right\_att}]_x$ is a 3-by-3 matrix, such that $$[\chi_{i,right\_att}]_x = \begin{bmatrix} 0 & -\chi_{3,right\_att} & \chi_{2,right\_att} \\ \chi_{3,right\_att} & 0 & -\chi_{1,right\_att} \\ -\chi_{2,right\_att} & \chi_{1,right\_att} & 0 \end{bmatrix}$$

In this example, $[\chi_{i,right\_att}]_x$ is a 3-by-3 matrix.

The predicted range difference 45, $\Delta \hat{r}_{i,right}$, corresponds to an estimate of the CPD distance for the $i^{th}$ sigma point set may be computed for all N sets of sigma points, as shown below.

$$\Delta \hat{r}_{i,right} = \|\hat{p}_{i,right\_forefoot} - (\hat{p}_{left} + \chi_{i,left\_pos})\| - \hat{r}_i$$

where $\hat{r}_i$ is the predicted heel-to-heel range measurement distance 47 described above; and $\chi_{i,left\_pos}$ is the $i^{th}$ set of position offset sigma points from the mean for the left foot.

It is understood that update process described for the right foot is merely exemplary and a similar calculation could be made for the left foot.

Because each round-trip measurement may include both a left-to-right foot CPD measurement and a right-to-left foot CPD measurement, the process described above and in FIG. 10 may also be performed to constrain the position of the left foot as well using the right-to-left CPD measurement and the corresponding position estimates of the right and left feet.

Zero-Velocity-Based Updates

An exemplary method for determining whether a ZUPT is possible and how to perform a ZUPT (and FRAZ and compass updates) is described in U.S. Pat. No. 8,224,575, the entire disclosure of which is incorporated by reference herein.

Figure 10:
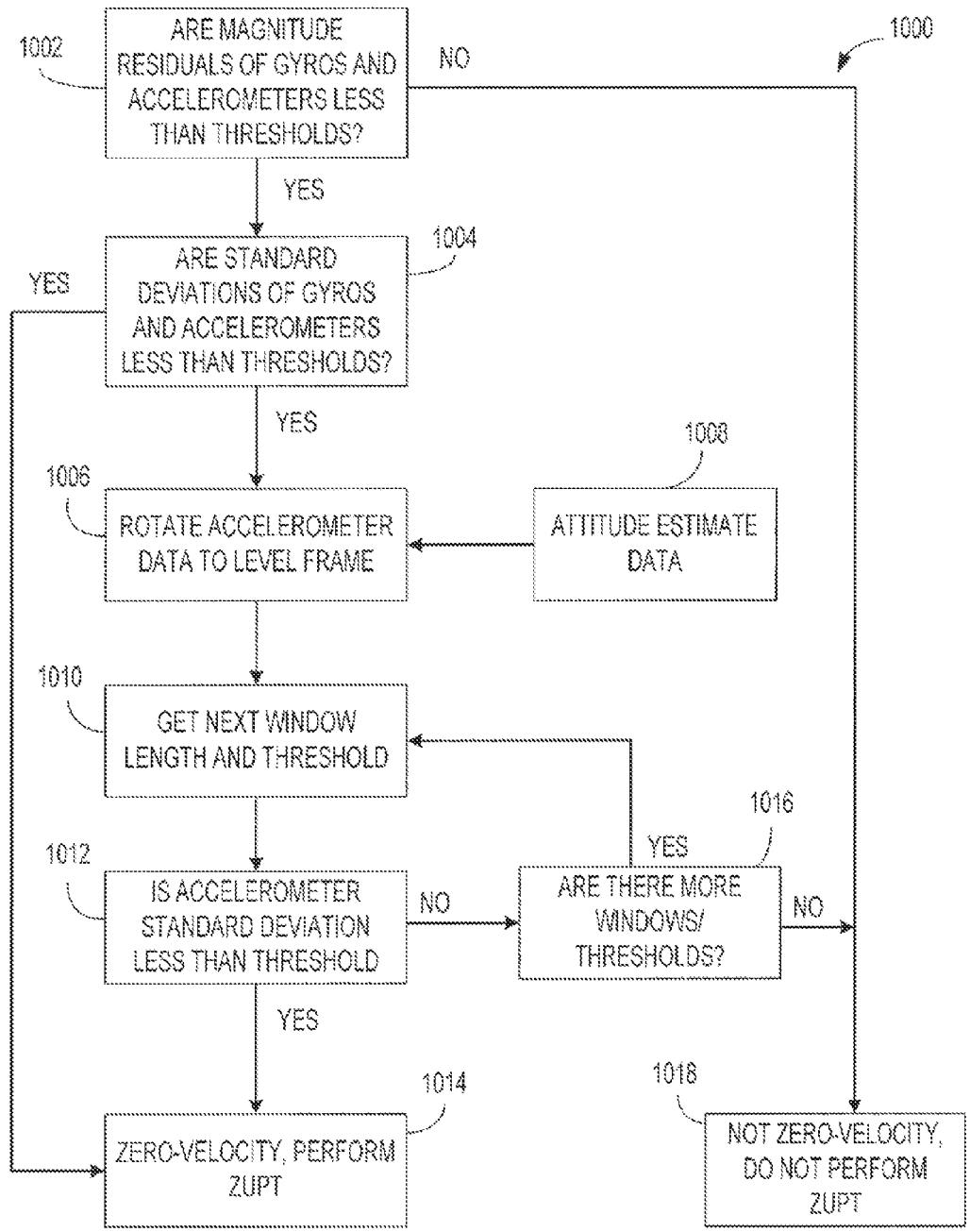
FIG. 10 is a flow diagram of an exemplary zero-velocity detection process.

FIG. 10 shows another exemplary zero-velocity detection method 1000 for performing a ZUPT. The method 1000 is described below as occurring in processing unit 12 of system 10, but it is contemplated that the method may occur in sensor unit 14, or external to system 10, such as in a secondary unit or a remote unit. The zero-velocity detection method 1000 determines, based on IMU data packets from IMU 13, if shoe or boot 20 is in a zero-velocity state, and therefore, whether a ZUPT can be performed. In step 1002, processing unit 12 determines whether the magnitude residuals of the gyroscopes and the accelerometers in IMU 13 are less than specified threshold values. The magnitude residual of a gyroscope is the difference between the magnitude of the gyroscope measurement and the magnitude of the Earth's rotation. The magnitude residual of an accelerometer is the difference between the magnitude of the accelerometer measurement and the magnitude of gravity. If either of the magnitude residuals is greater than the corresponding threshold value, then the foot containing the IMU is not in a zero-velocity condition and a ZUPT cannot be performed. In this situation, the method proceeds to step 1018, and does not perform a ZUPT. If both of the magnitude residuals are less than the corresponding threshold values, the method proceeds to step 1004.

At step 1004, processing unit 12 determines whether the standard deviations of the gyroscopes and the accelerometers are less than corresponding threshold values. At step 1004, the standard deviation of the gyroscopes is calculated over a predetermined window, which is centered on the current data sample, and processing unit 12 determines if this calculated standard deviation is less than a specified threshold value. The standard deviation of acceleration is also calculated over the same predetermined window and processing unit 12 determines if this calculated standard deviation is less than a specified threshold value. If both standard deviations of the gyroscope and the accelerometer are below the respective threshold values, then the IMU is likely in a zero-velocity state and the method proceeds to step 1014 in which a ZUPT is performed. If either the standard deviation of the gyroscope or the accelerometer over the window period is not below the corresponding threshold value, then the system may or may not be in a zero-velocity state and the method proceeds to step 1006, where further processing is performed.

Steps 1002 and 1004 are performed using the body frame data, that is, the axes of IMU 13. As explained above, during fast movements, body frame data can be masked by additional components, such as gravity, which contribute to the body frame components as IMU 13 rotates through the fast movement. Steps 1006-1012 and 1016 assist in mitigating the masking effect and contribute to identifying zero-velocity conditions in either fast or slow movements.

In step 1006, processing unit 12 rotates the accelerometer data from the body frame to a level frame. The level frame represents a coordinate frame in which gravity is measured along the vertical component of the frame, regardless of the actual orientation of IMU 13 (and accordingly, regardless of the body frame, which is defined by the orientation of IMU 13). According to some embodiments, the level frame represents the coordinate system shown in FIG. 3A, even when IMU 13 is rotated away from this coordinate system. Rotation to the level frame can be accomplished using the gyroscopic information from one or more IMU data packets.

By rotating into a level frame, the gravity component contributing to each data axis from IMU 13 can be identified and removed. In other words, in the level frame each data packet from IMU 13 is adjusted to account for a gravity component contributing to the measurement. The rotation of the coordinate axes to the level frame constrains the effect of gravity on each of the IMU accelerometer axes. This rotation of the coordinate axes to a level frame allows for a more accurate determination of whether the IMU is in a zero-velocity state by removing the gravity component. The rotation of accelerometer data to a level frame at step 1006 may be adjusted using an attitude estimate from the IMU as shown at step 1008. The method then proceeds to step 1010, where the window length and threshold is applied to the level frame-rotated data from step 1006.

At step 1010, a window length and threshold value is retrieved. The window is applied to IMU data and standard deviation value for the gyroscopes and/or accelerometers are calculated relative to the level frame-rotated data over the length of the window. The window length is centered on the current IMU sample. The window size and the threshold value may be empirically determined for various types of motion. Each type of motion, for example, walking, jogging, running, sprinting, and crawling, may have different window lengths and threshold values. For example, the window size and threshold for a running motion may be different from a jogging motion, a walking motion, and a crawling motion. Based on an empirical analysis, the window size decreases and the threshold value increases as the velocity of the movement increases. For example, in a walking motion, the window size will be larger and the threshold value will be lower than for a running motion. At step 1010, processing unit 12 retrieves a window length and threshold value for a particular type of motion and calculates the standard deviation for the accelerometers with reference to the level frame over the specified window. The method then proceeds to step 1012.

At step 1012, processing unit 12 compares the calculated standard deviation of acceleration with reference to the level frame over the window applied in step 1010 to the threshold value for the corresponding motion type. If the calculated level frame-rotated standard deviation is less than the corresponding threshold value, the method proceeds to step 1014, where a ZUPT is performed. If the calculated level frame-rotated standard deviation is not less than the corresponding threshold value, then the IMU is not in a zero-velocity condition and the method proceeds to step 1016.

At step 1016, processing unit 12 checks to determine if another window length and threshold for another motion type can been tested. For example, processing unit 12 may first test a walking motion at step 1012, then check to see if a window size for a crawling or motion is available in step 1016. According to some embodiments, processing unit 12 window lengths and thresholds may be correlated to particular motion types. It is also contemplated that processor 12 may check to see if a narrower window and/or higher threshold value is available at step 1016. If additional window sizes and/or thresholds are available, the method returns to step 1010, where the new window length and threshold are retrieved and a new standard deviation is calculated over the new window. If no more window sizes and/or thresholds are available, the method proceeds to step 1018 and no ZUPT is performed because processor 12 has determined that the IMU is not in a zero-velocity state.

According to some embodiments processing unit 12 steps through various window lengths and thresholds in increasing order of motion speed at step 1016. For example, processing unit 12 may first test a window and threshold for walking, then test a window and threshold for jogging, and then for running. According to some embodiments, processing unit 12 may decrease the window length and increase the threshold value at step 1016 either by using a lookup table, or applying an algorithm. Other embodiments are also contemplated.

Figure 11A:
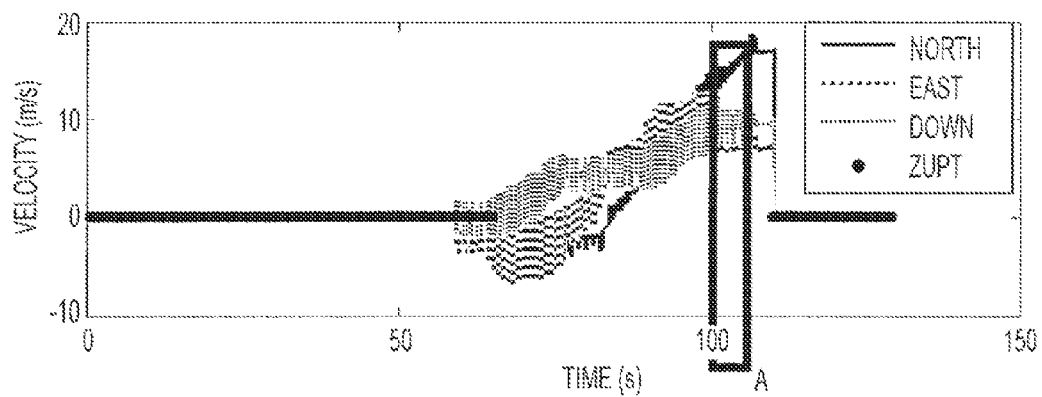
FIG. 11A is a plot of inertial data representing a zero-velocity detection process.
Figure 11B:
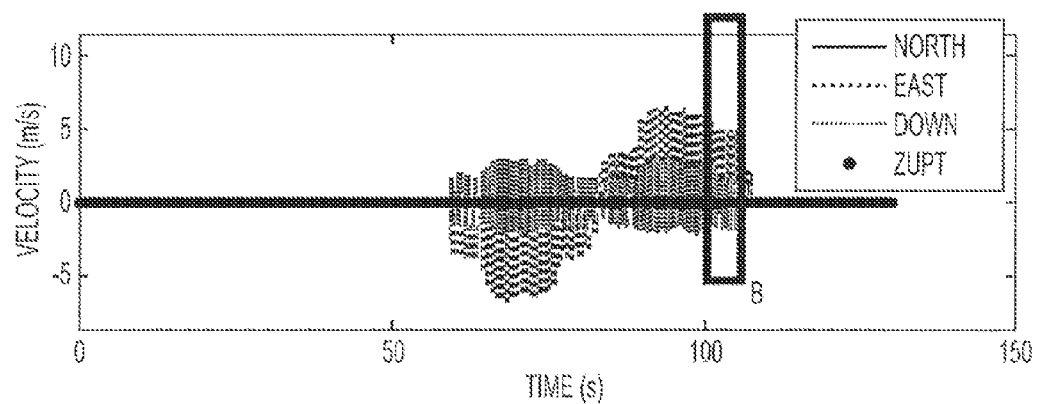
FIG. 11B is a plot of inertial data representing a zero-velocity detection process described in FIG. 10.

FIGS. 11A and 11B show exemplary velocity error calculations over about two minute time period in which a user walks for about 60 seconds, then jogs for about 50 seconds, then walks again for about 20 seconds. The measurements were performed using an Intersense NavChip IMU. References to North and East were taken relative to the user's starting position, while the reference to the Down direction is taken in the direction of the ground (i.e., gravity).

The measurements in FIG. 11A were carried out using a method that does not rotate the IMU data to a level frame. The measurements in FIG. 11B were carried out by rotating the IMU data to a level frame, such as described in FIG. 10. As can be seen in FIG. 11A, during the period of jogging (e.g., between 60-110 seconds), no ZUPTs were recorded and the velocity errors in all three directions increased substantially. As shown in FIG. 11B, ZUPTs were recorded throughout the entire test period, including during the entire jogging period, and the velocity errors were constrained.

Figure 12A:
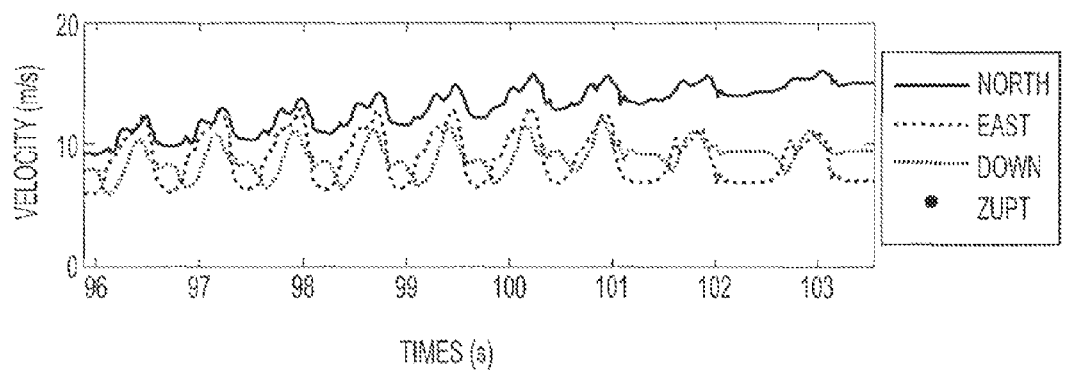
FIG. 12A is a detail view of selected data from FIG. 11A.
Figure 12B:
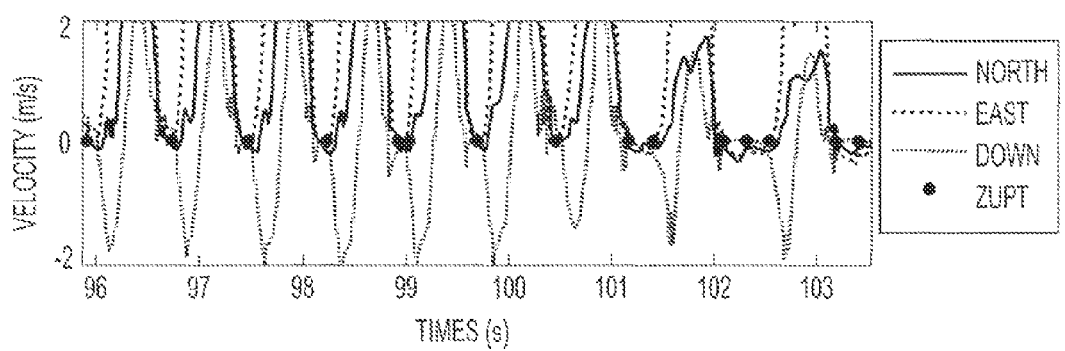
FIG. 12B is a detail view of selected data from FIG. 11B.

FIGS. 12A and 12B show the subsets of data contained within boxes A and B, which correspond to the periods between 96 and 103 seconds of FIGS. 11A and 11B respectively. As can be seen in FIG. 12A, no ZUPTs were recorded during this time period, which corresponded to the jogging portion of the data collection performed without rotating to a level frame. However, in FIG. 12B, corresponding to the ZUPT detection method of FIG. 10 in which data was rotated to a level frame, ZUPTs were recorded about once every second, constraining the velocity errors.

The zero-velocity detection method described in FIG. 10 may be particularly useful when the body frame coordinate system is offset, such as shown in FIG. 38.

According to some embodiments, the zero-velocity detection method 1000 may include only steps 1006 through 1018, without including steps 1002 and 1004. According to these embodiments, a zero-velocity detection method always determines whether IMU 13 is in a zero-velocity condition relative to the level frame without first testing relative to the body frame.

It is contemplated that the ZUPT detection method of FIG. 10 is applicable to any inertial navigation system and could be applied in any inertial system incorporating IMUs. According to some embodiments, the system incorporates a single IMU on a single foot. According to some embodiments, the system may incorporate more than one IMU, and each IMU may be located on more than one foot. When the system includes more than one IMU, the method disclosed in FIG. 10 can be performed on data from both IMUs simultaneously or sequentially.

GPS-Based Updates

To further improve the update process. GPS pseudoranges may also be incorporated into the update process when GPS information is available. As explained above, a GPS-based update to the Kalman filter may be, for example, an EKF-based update when the pedestrian changes position. Because the change in the unit vector for a GPS-update is negligible compared to the overall distance between the GPS satellite and the GPS antenna 16, an EKF-based update is appropriate. During an exemplary GPS-based update, a processor, for example processor 17 of FIG. 2B, determines whether a pseudorange measurement is present and usable. If so, the processor computes the transmission time and satellite locations. The processor then corrects the pseudorange measurements using correction factors, such as time, satellite-based augmentation systems (SBAS), and/or the Earth's rotation. The processor then updates the Kalman filter using the corrected data.

According to some embodiments, data received at one or more of GPS antennas 16 may be used to provide GNSS position and time solutions. Position solutions and time solutions generally refer to the data output from one or more of GPS receivers 15, although it is contemplated that they process of developing position and time solutions may occur in a processor apart from GPS receivers 15. Position and time solutions may include position data and time data corresponding to several satellites, for example four or more satellites. According to some embodiments, position and time solutions may be calculated from pseudorange data. The position and time solutions may be provided as an update to one or more filters, such as a Kalman filter.

Kalman Filter Update Selection and Other Updates

Updates to the Kalman filter can be provided by either an EKF, a UKF update, or any other type of Kalman filter. For simplicity. EKFs and UKFs are discussed below, although it is contemplated that other types of Kalman filters may be used. According to some embodiments, all updates can be performed using an EKF, or all updates can be performed using a UKF. An all-EKF Kalman filter update process may be appropriate when small position errors can be maintained relative to the range between the feet and the covariance estimate of the position of one foot with the position of the other foot will aid in maintaining an accurate vector between the feet, such as when initialization of the system is very accurate. However, if small position errors cannot be maintained, then a UKF based update may be necessary and can be applied for all updates.

However, because UKF updates are more computationally intensive than EKF updates, then according to some embodiments, the updates to the Kalman filters may take different forms depending on the basis for the update. This is referred to as a hybrid EKF/UKF-based update, which includes both EKF-based updates and UKF-based updates. For example, a UKF-based update may be used to compute DMR range or CPD-measurement updates, while EKF-based updates may be used when the basis is an IMU-based or GPS-based update. It is contemplated that any of the types of updates may employ other filters, for example, particle filters may serve as the basis for DMR measurement updates, such as range-measurement updates and CPD-measurement updates. Various types and bases for Kalman filter updates are described below.

Table 1 shows the preferred types of Kalman filter update types for updating the covariance matrix based on each type of sensor input from sensor unit 14.

TABLE 1

Kalman Filter Update Types

| Update | Sensor | Requirement | Benefit | Kalman Filter Update Type |
|---|---|---|---|---|
| Zero velocity (ZUPT) | IMU | Accelerometer magnitude and standard deviation below threshold | Constrains velocity profile through indications that the IMU is stationary | EKF |
| Frozen azimuth (FRAZ) | IMU | Sufficient time has passed since previous FRAZ during ZUPT period | Constrains heading through indications that the IMU is not rotation | EKF |
| Heading | Compass | Magnetometer data passed compass filter during ZUPT period | Constrains heading through updated estimate of magnetic north | EKF |
| GPS | GPS | GPS pseudorange measurement present | Constrains position errors by providing absolute position aid | EKF |
| Range | DMR | Range data present and passes filter | Constrains heading by providing relative distance between feet | UKF |
| CPD | DMR | CPD data present and passes filter | Constrains heading by providing relative yaw and pitch information between feet | UKF |

According to some embodiments, each Kalman filter update type updates the same covariance matrix; however, the decision whether to use an EKF- or UKF-based update may depend on the efficiency of the processing. Because EKF-based updates are computationally less intensive than UKF-based updates, an EKF-based update may be preferred when the errors are substantially linear, such as IMU errors or GPS errors. UKF-based updates are more computationally intensive than EKF-based updates, but provide a more complete solution when the errors are non-linear, such as with range-measurement updates and CPD-measurement updates. Thus, by applying different types of Kalman filter updates to the covariance matrix, the computational efficiency of the system can be improved.

According to some embodiments, the update of the Kalman fitter measures a residual value, which is the difference between an actual measurement, $z_k$, and a predicted measurement, $h(\hat{x}_k^-)$. In the measurement model $h_k$, the value $\hat{x}_k^-$ represents the predicted state at time k. In other words, for an EKF-based update:

$$\text{residual}_{EKF} = z_k - h(\hat{x}_k^-)$$

For an EKF, there may be a single predicted measurement based on the evaluation of the measurement model at the mean state, such that the measurement residual value is a scalar value given a scalar update measurement. The EKF-based Kalman gain is computed based on a linearized relationship in the observation matrix $H_k$, where $$H_k = \frac{\partial h_k}{\partial x}\bigg|_{\hat{x}_k^-}$$

When using a UKF update instead of an EKF update to the Kalman filter, two differences are employed. In the first difference, the predicted UKF measurements are a vector based on the evaluation of the measurement model, $h_k$, using a set of sigma points. The sigma points are computed using the current mean state estimate, $\delta\hat{x}_k^-$, and its associated covariance, $P_k^-$, such that the measurement residual value is a vector.

In the second difference, the UKF Kalman gain does not require a linearized state-to-measurement relationship for the UKF-based updated, but is instead a function of the directly computed covariance of the measurement residual and the directly computed covariance between the state and the measurement residual.

The UKF-based error state correction is then based on the UKF Kalman gain multiplied by a weighted average of the measurement residual error computed from the sigma points.

In the preferred UKF and EKF filters, 35 core states are tracked, including 16 error states for each IMU and 3 DMR measurement bias errors. According to some embodiments, instead of tracking the position, velocity, and attitude as the states of interest for the Kalman filter updates, the hybrid EKF/UKF update process described above tracks the errors in position, velocity, and attitude as the states of interest. The error states are then used to correct the position, velocity, and attitude. For each IMU 13 in the system 10, the following 16 error states may be included in the EKF state vector:

$\delta r$, which is a 3-element vector of north, east, and down position errors;

$\delta v$, which is a 3-element vector of north, east, and down velocity errors;

$\delta_\psi$, which is a 3-element vector of angles describing the misalignment of the body frame relative to the geographic frame;

$\delta b^{acc}$, which is a 3-element vector of time-correlated accelerometer errors;

$\delta b^{gyro}$, which is a 3-element vector of time-correlated gyroscopic errors; and $\delta\text{heading}^{prev}$, which is scalar value corresponding to the heading error at a previous time step and that is used to constrain heading error during stationary periods.

The dynamic equations based on an error model, such as a $\Psi$-angle error model, may then be used to update the transition and/or covariance matrices for the Kalman filter. Although the position and velocity errors, $\delta r$ and $\delta v$, respectively, are described as having north, east, and down elements as part of the 3-element vector, it is contemplated that these vectors are described in relation to the geographic frame. The actual axes of the IMU may be rotated as described with reference to FIGS. 3A and 3B, or may have other orientations. Similarly, the error vectors may be aligned with the axis directions of the IMUs 13.

Figure 9:
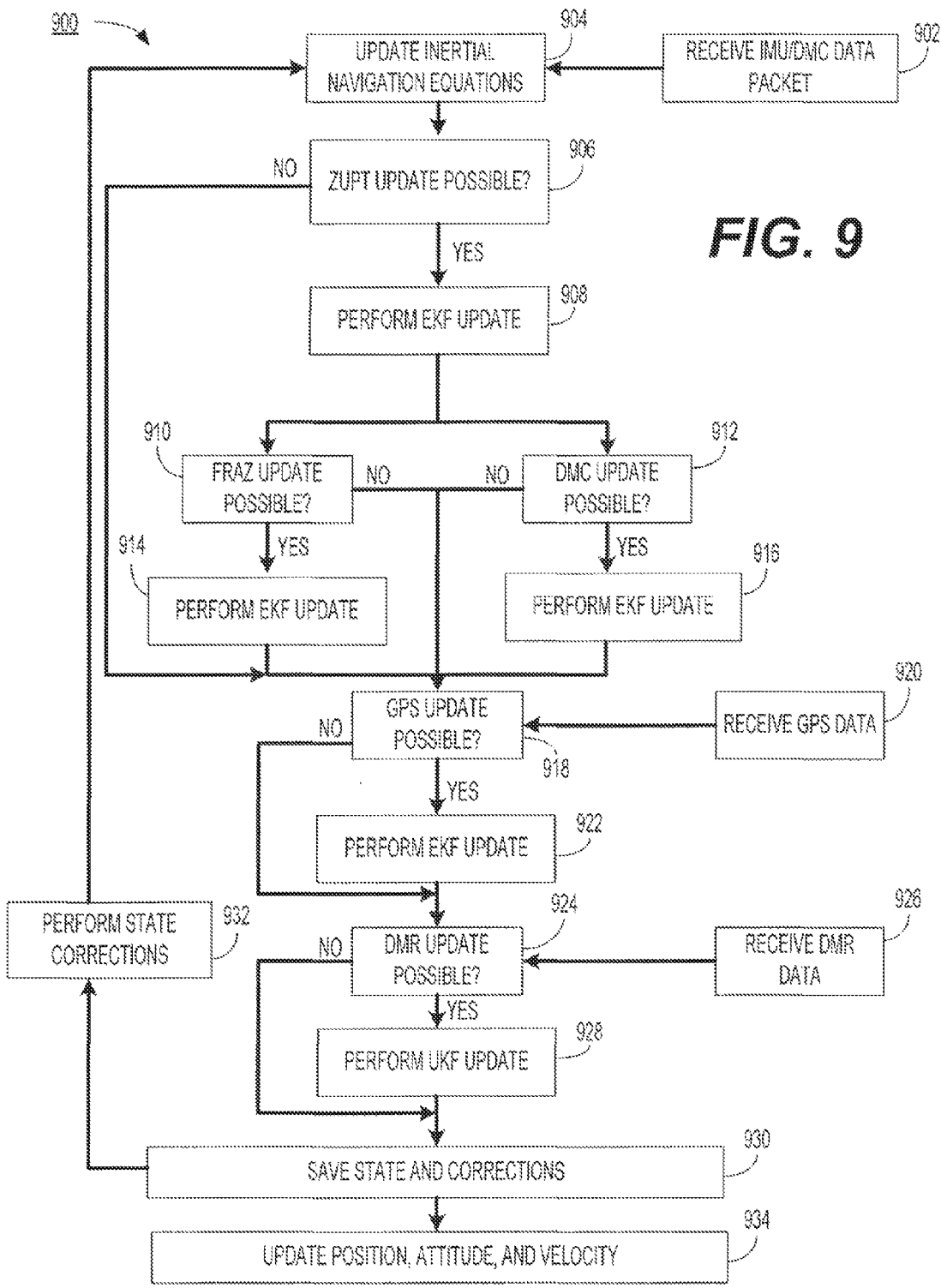
FIG. 9 is a flow diagram of an exemplary Kalman filter update process.

FIG. 9 shows a flow diagram of an exemplary Kalman filter update process 900 using an exemplary EFK/UKF hybrid model as described. For the reasons explained above, in FIG. 9, EKF-based updates are used for ZUPT, FRAZ, DMC, and GPS based Kalman updates, while UKF-based updates are used for DMR based updates, such as range-measurement updates and CPD-measurement updates. In the exemplary process 900 shown in FIG. 9, these respective EKF and UKF updates were chosen to improve computational efficiency, although it is contemplated that other combinations of EKF and UKF based updates, or particle filter updates, could be used.

At step 902 IMU and/or DMC data packets are received from, for example, IMU 13 shown in FIG. 2B. IMU and/or DMC data packets may be received by processing unit 12 of FIG. 2B, such as in processor 17. At step 904, a processor, such as processor 17, updates the inertial navigation equations using the received data packet. The process then proceeds to step 906, where processing unit 12, for example, determines whether a ZUPT to the Kalman filter is possible.

If it is determined that a ZUPT is possible, for example, satisfying the requirement for a ZUPT as described in Table 1 above, then the process proceeds to step 908, where an EKF-based ZUPT to the Kalman filter is performed. An exemplary method for determining whether a ZUPT is possible and how to perform a ZUPT (and FRAZ and compass updates) is described in U.S. Pat. No. 8,224,575, the entire disclosure of which is incorporated by reference herein, and also described above. According to some embodiments, method 1000 may be used to determine whether a ZUPT is possible. Other ZUPT processes are also contemplated. If it is determined that no ZUPT is possible, for example, the ZUPT requirement as shown in Table 1 above is not satisfied, and process 900 proceeds to step 918.

If a ZUPT is possible in step 906 and an EKF update is performed in step 908, the method 900 then determines if it is possible to perform a FRAZ update and/or a DMC update, at steps 910 and 912, respectively. In determining whether a FRAZ update or DMC update is possible, processing unit 12 may determine whether certain requirements for performing these updates, for example, as disclosed in Table 1 above, are satisfied. If processing unit 12 determines that a FRAZ update is possible at step 910, the method proceeds to step 914 where an EKF-based update to the Kalman filter is performed using the DMC data. Similarly, if processing unit 12 determines that a DMC update is possible at step 912, the method proceeds to step 916 where an EKF-based update to the Kalman filter is performed using the DMC data. After performing either or both of the updates in steps 914 and 916, the process 900 proceeds to step 918.

If processing unit 12 determines that no FRAZ update is possible at step 910, the method proceeds to step 918 and skips the EKF update at step 914. Similarly, processing unit 12 determines that no DMC update is possible at step 912, the method proceeds to step 918 and skips the EKF update at step 916.

Although FIG. 9 shows steps 910 and 912 in parallel, according to some embodiments, steps 910/914 and 912/916 may be performed sequentially. For example, step 910 may be performed following step 908. If a FRAZ update is determined to be possible at step 910, the process 900 proceeds to step 914, then to step 912. If no FRAZ update is determined to be possible at step 910, the process 900 may proceeds directly to step 912. At step 912, if a DMC update is determined to be possible, the process 900 proceeds to step 916, then to step 918. However, if no DMC update is determined to be possible at step 912, the method 900 proceeds directly to step 918.

At step 918, processing unit 12 determines whether a GPS-based update to the Kalman filter is possible. Processing unit 12 may determine whether a GPS-based update is possible, for example, by determining whether the requirement for a GPS based update is satisfied as described in Table 1 above. To determine whether this requirement is satisfied, processing unit 12 may use GPS data, such as data received from one of GPS antennas 16 and/or GPS receivers 15, as shown in FIG. 2B. GPS data may be received as part of step 920. If it is determined that a GPS-based update is possible, then method 900 proceeds to step 922, where the Kalman filter is updated using an EKF-based update. The method 900 then proceeds to step 924. If it is determined that no GPS-based update is possible, for example, if there is no GPS solution and/or no GPS pseudorange measurement available, then the method proceeds from step 918 directly to step 924 without performing a GPS-based update.

At step 924, processing unit 12 determines whether a DMR update to the Kalman filter is possible. As described above, a DMR update may include one or more of a range-measurement update or a CPD-measurement update. The determination whether a DMR update is possible may be made using DMR data received during step 926. Processing unit 12 may determine whether to perform a DMR update to the Kalman filter, for example, as described in Table I above. If it is determined that a DMR update is possible, the method 900 proceeds to step 928, where one or both of a range-measurement update and a CPD-measurement update are performed, as described above, for example, using a UKF-based update to the Kalman filter. It is also contemplated that a particle filter-based update may be used for a DMR update. The method then proceeds to step 930. If it is determined that no DMR update is possible, for example, because no DMR data is present, then the method proceeds directly from step 924 to step 930 without performing the DMR update.

At step 930, the state of the Kalman filter, such as the covariance matrix and state transition matrix, are stored in memory, for example memory 19 as shown in FIG. 2B. At step 930, corrections made to the Kalman filter are also stored in memory. After saving the states and corrections at step 930, the method then performs state corrections to the Kalman filter at step 932, which is used to update the inertial navigation equations at step 904. Last, at step 934, the method 900 also updates the position, attitude, and velocity of the pedestrian using the saved states and corrections to the Kalman filter from step 930. In other words, the last step of update process 900 is to update the estimated position of the pedestrian using the updated Kalman filter, covariance matrix, and state transition matrix. As shown in FIG. 9, the method 900 may be repeated each time new IMU and/or DMC data packets are received.

Variations of method 900 are contemplated. For example, DMR updates may be part of the same update step, e.g., steps 924 and 928, or may be entirely separate steps, one for a range-measurement update and one for a CPD-measurement update. Similarly, each test step (e.g., steps 906, 910, 912, 918, and 924) may be performed as a separate process or as a single unitary process. According to some variations, the filter update steps (e.g., steps 908, 914, 916, 922, and 928) may each proceed to step 930 or 932.

Although updates to Kalman filters are described herein, it is contemplated that other types of filters, including but not limited to particle filters, may be used for at least one update. For example, other types of filters may be used to update state values, error values, perform state corrections, update navigation equations, and update position or time estimates.

Initialization of System

According to some embodiments of the system disclosed in this specification, the position values may be initialized prior to tracking the pedestrian using the inertial measurements and Kalman filters.

According to some embodiments, a two-step initialization procedure may be performed. In the first step, user 11 places one of boots 20, over a known location for at least a predefined period of time, for example, 10 seconds, and facing a predefined direction, for example magnetic north or true north. One or both of the predefined time and predefined direction may be specified in software or may be entered as part of the initialization procedure. In the second step of the initialization process, user 11 walks in view of GPS satellites for at least a minimum period of time, for example, 200 seconds.

According to some embodiments, the system may be initialized with respect to a starting position received via a radio frequency identification (RFID) tag or the last-known GPS location (such as before a GPS signal was lost). To implement an RFID initialization, an RFID tag may be embedded into, for example, a mat placed on the ground that remains in a fixed location while system 10 is tracking user 11. User 11 may stand over the mat for a brief period of time, where the position of IMU 13 is set via the RFID tags to predetermined values. If user 11 passes the RFID tag in the future, the update process may use the known position of the RFID tag to further improve accuracy. According to some embodiments, multiple RFID tags may be placed at different locations, such as within the same building or cave complex, while system 10 is in use. By using multiple RFID tags, multiple known positions can serve as known locations to provide updates. Use of multiple RFID tags may be especially beneficial in low-light or highly complex navigation situations, such as caves, canyons, mines, or large bunkers. RFID tags may be used as part of the two-step initialization process described above or as an independent initialization procedure.

According to some embodiments, initialization may occur using the last-known GPS position and velocity of user 11. For example, if user 11 is in view of a GPS signal and moving for a specified period of time, for example 200 seconds, then system 10 may use the last known heading vector and position of user 11, based on the GPS tracking data, as the initialization coordinates for system 10.

DMR Frequency Agility

In some situations, multiple systems 10 may be operating in close proximity to each other, for example, when multiple personnel are located in close proximity to each other. These situations can occur when squads of warfighters are clearing buildings, mines, or caves. Such situations may also occur when first responders, such as search and rescue personnel, are searching canyons, mines, caves, or other confined structures.

According to some embodiments, data packets transmitted between DMR antennas 18a and 18b of each system 10 may include a unique header identifier or system-specific identifier so that each system 10 can identify wireless transmissions from itself while filtering transmissions from other nearby systems or antennas.

According to some embodiments, each system 10 may undergo a frequency agility process. In an exemplary frequency agility process, one or more of DMR antennas 18 in each system, for example an originator antenna on the primary boot, will scan for an unused RF channel. This scanning may occur as part of an initialization procedure. The scanning DMR antenna 18 listens for DMR activity on each channel scanned, and selects an unused channel for transmission of wireless signals. If all channels are in use, then the scanning DMR antenna 18 will select the channel with the lowest level of interference or activity. A corresponding, non-scanning DMR antenna 18, for example one of DMR antennas 18 on the transponder or non-primary boot of system 10, will monitor the RF channels listening for a signal from the scanning DMR antenna 18. When the corresponding, non-scanning DMR antenna 18 receives a measurement request signal from DMR antenna 18 on the scanning boot, the non-scanning DMR antenna will reply to complete the measurement, for example, range measurement 22, described above. System 10 will then continue to transmit on the selected channel.

Although the frequency agility process is described as occurring at startup or initialization, it is contemplated that system 10 may continuously monitor the selected RF channel for dropped transmissions or significant interference which may inhibit communications. If dropped transmissions are detected or if the interference level exceeds a predefined threshold, then system 10 may implement a new frequency agility process to select a new RF channel.

Extreme Shock and Boot Reset Modes

According to some embodiments, an "extreme shock" and reset mode may be incorporated into the Kalman filter update process. An extreme shock and reset mode may be useful in situations where excessively high g-forces corrupt location calculations and inertial measurements. For example, such situations may occur when warfighters and first responders kick in doors or stomp their feet. During these actions, the acceleration in the IMU 13 exceeds the accelerometer's dynamic range for brief periods, such as less than 0.1 seconds, but the gyroscopic measurements will not exceed the gyroscope's dynamic range. DMR measurements may also be disabled during the extreme shock period because the orientation and motion of the user's body may provide inaccurate measurements of location.

To determine whether an extreme shock even has occurred, the system 10 determines whether the raw accelerometer measurements exceed the dynamic range of the sensor. As explained above, the dynamic range of the sensor may be improved by rotating the accelerometers by 45 degrees, as shown in FIG. 38. This rotation may prevent the system 10 from falsely entering and extreme shock or boot reset mode during certain actions, such as running or jumping. When an extreme shock event is occurring, the system 10 may enter a "boot reset" mode to mitigate growth of position errors during the extreme shock event.

During the boot reset mode, the shocked boot (i.e., the boot undergoing the extreme shock event) and the non-shocked boot are processed differently. During the extreme shock event, the non-shocked boot (for example, the boot resting on the ground) continues to update the position, velocity, and attitude using inertial navigation equations. Also during the extreme shock event, the shocked boot's position is fixed to the last time and position before the extreme shock event occurred. The position of the shocked boot is fixed throughout the entire extreme shock event. The shocked boot also skips position and velocity computations in the inertial navigation equations during the extreme shock event, although it continues the attitude computations using the inertial navigation equations.

After the extreme shock event, the shocked boot resets all velocity component state estimates to zero. The shocked boot may also increase the position and velocity state error state estimates to accommodate for the uncertainty in the actual states that occurred during the shock event. The shocked boot also retains all IMU sensor errors (e.g., accelerometer bias and gyroscope bias) from before the extreme shock event. After these updates in the shocked boot take place, both the shocked boot and the non-shocked boot resume real-time data processing.

Software Architecture

According to some embodiments, system 10 collects, synchronizes, and parses data from the IMUs 13 and other sensors in sensor units 14. This data is used to calculate PNT results. Both the raw data and the PNT results can be logged and reported in real time with the calculations. Because processors 17 are dedicated processors, data from sensor units 14, for example data from IMUs 13, DMR antennas 18, GPS antennas 16, or DMCs, a single loop can run without interruption for collecting and processing data. According to some embodiments, a single boot 20, referred to here as a primary boot, consumes data from all sensors, including GPS data and IMU data from the non-primary boot. Data from the non-primary boot may be sent to the primary boot by connection 23, as shown in FIG. 2B. The primary boot controls the data flow from sensor units 14 by storing data packets in sensor queues corresponding to each sensor of sensor units 14.

Data packets from the sensor queues may then move to a service queue. Processor 17 may extract the data packets from the service queue to monitor the system health and perform initial processing on the data packets. The service queue may also be used to parse the various data packets from the sensor queues into a standardized form for processing and storage. For example, processor 17 may use timing information contained in each data packet to synchronize the data packets. Because the processor clocks can be synchronized via DMR measurements, data packets from the primary and non-primary boot can be coordinated for processing.

Data synchronization may be performed relative to the nearest timestamp for an IMU measurement. Since the processors of the primary and non-primary boot are synchronized with timestamps from the DMR, it can be assumed that the timestamps from both the primary boot and the non-primary boot in the data packets are correlated. Using the timestamps, processor 17 may organize data from the sensor queues or service queues into a table based on the timestamp of each data packet. Processor 17 may also reformat the data packets from the various sensors into a common format for easier consumption during data processing and PNT calculations.

Monitoring system health may include determining the sensor health, such as whether processor 17 can communicate with the various sensors or can retrieve data from the sensors of either the primary or the non-primary boot.

Monitoring sensor health may also include determining whether any sensors in sensor units 14 are experiencing persistent data quality issues. Data quality issues may include sensor dropouts, dropped data packets, persistent interference, clipping, or corrupted data.

Processor 17 may also use data from the service queue to determine positioning health. Positioning health may include determining whether system's 10 position estimates are reasonable, for example whether the position errors have grown unreasonably large, and/or whether system 10 needs to be reinitialized to correct positioning estimates. Positioning health monitoring may also be used to determine whether the accelerometers of one or both IMUs 13 are out of range and need to be reset. If a reinitialization of either system 10 or IMU 13 cannot be completed, then processor 17 may flag and record the failed reinitialization.

Monitoring system health may also determine whether there is sufficient battery power to continue collecting and processing data, or whether the system should be shut down or placed in a standby mode to conserve power. By monitoring the remaining battery power of the system and shutting down the system, processor 17 may prevent corruption or loss of data.

Processor 17 may then log the data packets from the sensor queues or service queue to a memory 19. As explained above, these data packets may be parsed or consolidated into a standard form for use in signal processing. After logging and/or storing the data packets, processor 17 processes the data from sensor units 14, such as by updating PNT and updating the Kalman filters, as described above. The PNT and/or updated Kalman filter information may then be stored in memory 19 of the primary boot. PNT data can also be transmitted via one or both of communication links 25 and 27. Storage of PNT and raw data in memory 19 allows for post-mission processing and data retrieval. Transmission by communication links 25 and 27 also provides the capability for user 11 or other parties to collect PNT data from multiple users simultaneously. Simultaneous collection from multiple users allows for better coordination of each and tracking of groups of users in real time. Transmission by communication links 25 and 27 also allows for consumption and processing of the data by a body-worn system, such as for more advanced processing.

After storing and/or transmitting the PNT data, processor 17 retrieves the next set of data from the sensor queues or the service queues and repeats the data flow.

The non-primary boot has a similar system flow to the primary boot in that it has sensor queues for collecting data packets from the sensors in sensor unit 14 of the non-primary boot. The data packets in the sensor queues may be passed to a service queue, where the data packets may be processed or modified as described above. Processor 17 may monitor the system health of the non-primary boot and log or store the data packets in memory 19 of the non-primary boot, as described above. Processor 17 then adds the data, and optionally the system health information, to a transmission queue, such as a Bluetooth transmission queue, for transmission via connection 23 to the primary boot. Information in the transmission queue is then transmitted to the primary boot, where it may be stored in one of the primary boot's sensor queues and processed, as described above. After adding the data to the transmission queue, processor 17 of the non-primary boot transfers new data packets from its sensor queues to its service queues and repeats the process described above.

Further in accordance with the present disclosure, a computer-readable storage medium may contain instructions to configure a processor to perform one or more of the previously described processes and methods. The computer readable medium may also be used as part of the previously described systems.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Additionally, although aspects of the disclosure are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this disclosure are within the skill of an experienced developer. The various programs or program modules can be created using any of the techniques known to one skilled in the art or can be designed in connection with existing software. For example, program sections or program modules can be designed in or by means of Java, C, C++, and MATLAB code.

Headings used in this description are for provided merely for convenience to facilitate description of the disclosed examples and embodiments. The headings are not limiting of the descriptions, disclosure, or examples.

Moreover, while illustrative embodiments have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for performing a carrier phase difference measurement comprising:
    transmitting a first wireless signal from a first originator antenna of an originator device to a first transponder antenna and a second transponder antenna of a transponder device, the first transponder antenna and the second transponder antenna having a known relative separation;
    receiving said first wireless signal at said first transponder antenna and said second transponder antenna; and
    calculating a first differential distance, based on said first wireless signal received at said first transponder antenna and said second transponder antenna,
    wherein said first differential distance is the difference between a first distance and a second distance,
        wherein said first distance is the distance between the first originator antenna and said first transponder antenna, and
        wherein said second distance is the distance between said first originator antenna and said second transponder antenna.

2. The method according to claim 1, further comprising:
    calculating said first distance; and
    updating an estimate of a position using said first distance and said first differential distance.

3. The method according to claim 2, further comprising:
    transmitting a second wireless signal from said first transponder antenna to said first originator antenna and a second originator antenna of said originator device;
    receiving said second wireless signal at said first originator antenna and said second originator antenna;
    calculating a second differential distance, based on said second wireless signal received at said first originator antenna and said second originator antenna,
    wherein said second differential distance is the difference between said first distance and a third distance,
        wherein said third distance is the distance between said first transponder antenna and said second originator antenna;
    wherein said estimating said position further includes using said second Differential distance.

4. The method according to claim 1, wherein calculating said first differential distance comprises computing the difference between a first carrier phase received at said first transponder antenna and a second carrier phase received at said second transponder antenna.

5. The method according to claim 4, further comprising:
    calculating said first carrier phase by computing a first in-phase channel signal and a first quadrature channel signal based on said first wireless signal received by said first transponder antenna, and
    calculating said second carrier phase by computing a second in-phase channel signal and a second quadrature channel signal based on said first wireless signal received by said second transponder antenna.

6. The method according to claim 5, wherein calculating said first carrier phase comprises calculating the arctangent of said first quadrature signal over said first in-phase channel signal, and
    wherein calculating said second carrier signal comprises calculating the arctangent of said second quadrature signal over said second in-phase channel signal.

7. The method according to claim 1, wherein calculating said first differential distance comprises calculating the difference between a first baseband phase of said first wireless signal received at said first transponder antenna and a second baseband phase of said first wireless signal received at said second transponder antenna.

8. A system for performing a carrier phase difference measurement comprising:
    a transponder device comprising
        a first transponder antenna configured to receive a first wireless signal from a first originator antenna of an originator device, and
        a second transponder antenna configured to receive the first wireless signal from the first originator antenna, the first transponder antenna and the second transponder antenna having a known relative separation;
    a processor; and
    a memory storing instructions that, when executed on the processor, perform the step of calculating a first differential distance based on the first wireless signal received at the first transponder antenna and the second transponder antenna,
    wherein the first differential distance is the difference between a first distance and a second distance,
        the first distance being the distance between the first originator antenna and the first transponder antenna, and
        the second distance being the distance between the first originator antenna and the second transponder antenna.

9. The system according to claim 8, wherein the instructions further perform the steps of:
    calculating the first distance; and
    updating an estimate of a position using the first distance and the first differential distance.

10. The system according to claim 9, wherein the first transponder antenna is further configured to transmit a second wireless signal from the first transponder antenna to the first originator antenna and a second originator antenna of the originator device; and
    wherein the instructions further perform the steps of:
        calculating a second differential distance based on the second wireless signal received at the first originator antenna and the second originator antenna,
        the second differential distance corresponding to the difference between the first distance and a third distance, the third distance being the distance between the first transponder antenna and the second originator antenna, and
        estimating the position using the second differential distance.

11. The system according to claim 8, wherein calculating the first differential distance comprises computing the difference between a first carrier phase received at the first transponder antenna and a second carrier phase received at the second transponder antenna.

12. The system according to claim 11, wherein the instructions further perform the steps of:
    calculating the first carrier phase by computing a first in-phase channel signal and a first quadrature channel signal based on the first wireless signal received by the first transponder antenna, and
    calculating the second carrier phase by computing a second in-phase channel signal and a second quadrature channel signal based on the first wireless signal received by the second transponder antenna.

13. The system according to claim 12, wherein calculating the first carrier phase comprises calculating the arctangent of the first quadrature signal over the first in-phase channel signal, and
    calculating the second carrier signal comprises calculating the arctangent of the second quadrature signal over the second in-phase channel signal.

14. The system according to claim 8, wherein calculating the first differential distance comprises calculating the difference between a first baseband phase of the first wireless signal received at the first transponder antenna and a second baseband phase of the first wireless signal received at the second transponder antenna.

\* \* \* \* \*